(12) United States Patent
Shioiri et al.

(10) Patent No.: US 8,147,364 B2
(45) Date of Patent: Apr. 3, 2012

(54) FLOW RATE REGULATION VALVE, ROTATING BODY, AND BELT-TYPE STEPLESS TRANSMISSION

(75) Inventors: Hiroyuki Shioiri, Susono (JP); Hiroaki Kimura, Susono (JP); Shinya Fujimura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 706 days.

(21) Appl. No.: 12/294,053

(22) PCT Filed: Mar. 27, 2007

(86) PCT No.: PCT/JP2007/056491
§ 371 (c)(1),
(2), (4) Date: Sep. 23, 2008

(87) PCT Pub. No.: WO2007/116767
PCT Pub. Date: Oct. 18, 2007

(65) Prior Publication Data
US 2009/0105020 A1  Apr. 23, 2009

(30) Foreign Application Priority Data
Mar. 28, 2006 (JP) .................... 2006-089373

(51) Int. Cl.
*F16H 59/00* (2006.01)
(52) U.S. Cl. ............................................. 474/28
(58) Field of Classification Search .......... 474/8, 28; 137/869, 881, 885
See application file for complete search history.

(56) References Cited

U.S. PATENT DOCUMENTS
3,857,404 A    12/1974  Johnson
5,356,347 A  * 10/1994  Komura et al. ............. 474/28

FOREIGN PATENT DOCUMENTS
JP    50 1275        1/1975
JP    51 83029       7/1976
JP    62-63449       4/1987
(Continued)

OTHER PUBLICATIONS
Office Action issued Sep. 17, 2010, in Japanese Patent Application No. 2006-089373.

*Primary Examiner* — William E Dondero
(74) *Attorney, Agent, or Firm* — Oblon, Spivak, McClelland, Maier & Neustadt, L.L.P.

(57) ABSTRACT

A flow control valve is provided in a primary pulley that is a rotor, and includes a first port; a second port; a working fluid channel formed between the first port and the second port and through which working oil passes; a check valve that is formed in the working fluid channel and is opened toward a first-port-side channel from a second-port-side channel of the working fluid channel; and a valve-opening control section (a guide member, a spool, a cylinder, and a drive pressure chamber) that is arranged at the check valve at the side of the second port, that forcibly opens the check valve when discharging the working fluid from the first port to the second port, and increases a channel resistance of the second-port-side channel as an opening amount of the check valve is small. The flow control valve can prevent over-discharge of the working fluid at the beginning of opening the valve.

18 Claims, 15 Drawing Sheets

FOREIGN PATENT DOCUMENTS

| | | |
|---|---|---|
| JP | 3 20769 | 2/1991 |
| JP | 4-231780 | 8/1992 |
| JP | 6-4451 | 1/1994 |
| JP | 7 180779 | 7/1995 |
| JP | 10-196819 | 7/1998 |
| JP | 2005-155897 | 6/2005 |
| JP | 2006 64008 | 3/2006 |

* cited by examiner

FLOW RATE REGULATION VALVE, ROTATING BODY, AND BELT-TYPE STEPLESS TRANSMISSION

TECHNICAL FIELD

The present invention relates to a flow control valve, a rotor provided with the flow control valve, and a belt-type continuously variable transmission provided with the rotor.

BACKGROUND ART

In general, a check valve allows a flow of a working fluid in one direction and inhibits a flow of the working fluid in the reverse direction. There are some check valves that are forcibly opened to allow the flow of the working fluid in the reverse direction.

For example, a cut valve (check valve) disclosed in Patent Document 1 closes the opening of a valve seat by a ball valve body that is biased toward an input port by spring means between the input port and an output port. A projecting member is moved toward the output port via a slider by a pressure of a control port, and the moving projecting member moves the ball valve body toward the direction apart from the opening of the valve seat, whereby the valve is forcibly opened.

Patent Document 1: Japanese Patent Application Laid-open No. 7-180779

DISCLOSURE OF INVENTION

Problem to be Solved by the Invention

About a check valve that can forcibly be opened, there is a demand to control the flow rate of the working fluid flowing from the input port to the output port upon forcibly opening the valve. Specifically, there is a demand for a flow control valve that has a function as a check valve. However, the check valve disclosed in the Patent Document 1 has a problem that, even if the moving amount of the ball valve body in the direction apart from the opening of the valve seat is controlled by the pressure of the control port, it is difficult to control the opening amount of the valve because of the pressure difference between the input port and the output port. Specifically, the opening amount of the valve may become equal to or more than the opening amount of the valve corresponding to the moving amount due to the pressure of the control port at the beginning of opening the valve in which the ball valve body is apart from the opening of the valve seat. Therefore, the working fluid might be over-discharged at the beginning of opening the valve.

The present invention is accomplished in view of the above-mentioned circumstance, and aims to provide a flow control valve, a rotor, and a belt-type continuously variable transmission that can at least prevent over-discharge of a working fluid at the beginning of opening a valve.

Means for Solving Problem

A first flow control valve according to the present invention includes a first port; a second port; a working fluid channel that is formed between the first port and the second port, and through which a working fluid passes; a check valve that is arranged in the working fluid channel, and is opened toward a first-port-side channel from a second-port-side channel of the working fluid channel; and a valve-opening control section that is arranged at the check valve at the side of the second port, that forcibly opens the check valve when discharging the working fluid from the first port to the second port, and that increases a channel resistance of the second-port-side channel at the beginning of opening the check valve.

A second flow control valve according to the present invention includes a first port; a second port; a working fluid channel that is formed between the first port and the second port, and through which the working fluid passes; a check valve that is arranged in the working fluid channel, and is opened toward a first-port-side channel from a second-port-side channel of the working fluid channel; and a valve-opening control section that is arranged at the check valve at the side of the second port, that forcibly opens the check valve when discharging the working fluid from the first port to the second port, and that increases a channel resistance of the second-port-side channel as an opening amount of the check valve is small.

The valve-opening control section increases the channel resistance of the second-port-side channel at the beginning of opening the check valve or as the opening amount of the check valve is small, when forcibly opening the check valve, so as to make it difficult to flow the working fluid from the first port to the second port. Therefore, immediately after the check valve is opened, i.e., at the beginning of opening the valve, the discharge rate of the working fluid discharged from the first port to the second port can be decreased. Accordingly, the over-discharge of the working fluid at the beginning of opening the valve can be prevented.

Preferably, in the present invention, the flow control valve further includes a third port between the check valve and the valve-opening control section in the working fluid channel, wherein the working fluid having a pressure for opening the check valve is supplied from the third port when supplying the working fluid to the first port from the third port.

When the working fluid having the pressure for opening the check valve is supplied between the check valve and the valve-opening control section from the third port, the check valve is opened, whereby the working fluid is supplied from the third port to the first port. Therefore, a single check valve can supply the working fluid to the portion communicating with the first port, can discharge the working fluid from the portion communicating with the first port, and can retain the working fluid at the portion communicating with the first port.

Preferably, in the present invention, the valve-opening control section includes a spool that is arranged so as to be slidable in the axial direction in the working fluid channel, wherein the spool forcibly opens the check valve by moving toward the first port in the axial direction, and reduces a channel sectional area between the spool and the second-port-side channel at the beginning of opening the check valve.

Preferably, in the present invention, the valve-opening control section in the flow control valve includes a spool that is arranged so as to be slidable in the axial direction in the working fluid channel, wherein the spool forcibly opens the check valve by moving toward the first port in the axial direction, and reduces a channel sectional area between the spool and the second-port-side channel as an amount of the moving is small.

The spool moves toward the first port in the axial direction so as to forcibly open the check valve. Further, at the beginning of opening the check valve by the spool or as the moving amount of the spool is small, the channel sectional area between the spool and the second-port-side channel decreases, which makes it difficult to flow the working fluid from the first port to the second port. Therefore, immediately after the check valve is opened, i.e., at the beginning of opening the valve, the spool can reduce the discharge rate of the working fluid discharged from the first port to the second port. Accordingly, the over-discharge of the working fluid at the beginning of opening the valve can be prevented.

Preferably, in the present invention, the spool in the flow control valve is arranged coaxial with the working fluid channel.

A streamline through which the working fluid, which is discharged from the first port to the second port via the spool, passes can be made linear. Therefore, the channel resistance when the working fluid is discharged from the first port to the second port via the spool can be reduced. Further, the responsiveness for the discharge rate control of the working fluid discharged from the first port to the second port via the spool can be enhanced.

Preferably, in the flow control valve according to the present invention, the spool has a tapered shape at a portion opposite to the check valve.

Since the spool has the tapered shape, the influence on the streamline, through which the working fluid passes, given by a collision of the working fluid with the spool can be reduced. Therefore, the responsiveness for the discharge rate control of the working fluid discharged from the first port to the second port via the spool can further be enhanced. Since a dynamic pressure exerted to the spool is reduced, a positional control of the spool in the axial direction can be facilitated.

A first rotor according to the present invention has the flow control valve descried above, wherein the check valve includes a valve seat, a valve body that is opened when the valve body is apart from the valve seat, and a regulating section that regulates a movement of the rotor toward the outside in the diameter direction when the valve body is apart from the valve seat.

The regulating section regulates the movement of the valve body toward the outside of the rotor in the diameter direction, even if a centrifugal force toward the outside of the rotor in the diameter direction is applied to the valve body due to the rotation of the rotor provided with the flow control valve. Therefore, the positional relationship between the valve body and the valve seat in the axial direction can be maintained when rotating the rotor. In particular, a behavior of the valve body from the opened state to the closed state of the check valve can be stabilized, whereby the responsiveness to the closed state of the check valve can be enhanced.

A second rotor according to the present invention has the flow control valve described above, wherein the longitudinal direction of the flow control valve is skew with respect to the axial direction of the rotor.

An influence of the flow control valve to the length of the rotor in the axial direction can be reduced. Therefore, the increase in the length of the rotor in the axial direction can be suppressed, so that the rotor can be miniaturized.

Preferably, in the rotor of the present invention, the valve-opening control section has a drive pressure chamber that forcibly opens the check valve by a pressure of the supplied working fluid, wherein a rotating radius of the drive pressure chamber is larger than a rotating radius of the other portion where the working fluid is present.

Since the rotating radius of the drive pressure chamber is larger than the rotating radius of the other portion where the working fluid is present, a centrifugal hydraulic pressure applied to the drive pressure chamber becomes larger than a centrifugal hydraulic pressure of the other portion where the working fluid is present. Accordingly, the pressure of the drive pressure chamber can be decreased when the valve-opening control section forcibly opens the check valve. By virtue of this, an increase in a power loss of a fluid pump that supplies the working fluid to the drive pressure chamber can be suppressed.

A belt-type continuously variable transmission according to the present invention includes two pulleys having two pulley shafts that are arranged parallel to each other, to either one of which a driving force from a driving source is transmitted, two movable sheaves that slide on the two pulley shafts in the axial direction, respectively, two stationary sheaves that are opposite to the two movable sheaves in the axial direction, respectively; a belt that transmits the driving force transmitted to either one of two pulleys from the driving source, to the other pulley; and a positioning hydraulic chamber that presses the movable sheaves to the stationary sheaves, wherein the rotor described above is either one of the two pulley shafts.

The rotor having the aforementioned flow control valve is used for the belt-type continuously variable transmission. Therefore, the effect of the rotor can be provided in the belt-type continuously variable transmission.

Preferably, in the belt-type continuously variable transmission, the first port communicates with the positioning hydraulic chamber.

When the working fluid is discharged from the positioning hydraulic chamber, the over-discharge of the working fluid at the beginning of opening the check valve can be prevented. Further, a single check valve can supply the working fluid to the positioning hydraulic chamber via the first port, can discharge the working fluid from the positioning hydraulic chamber via the first port, and can retain the working fluid at the positioning hydraulic chamber.

Effect of the Invention

The flow control valve, rotor and belt-type continuously variable transmission according to the present invention provides an effect of capable of suppressing over-discharge of the working fluid at the beginning of opening a valve.

BRIEF DESCRIPTION OF DRAWINGS

FIG. 5-1 is a view showing a torque cam;

FIG. 5-2 is a view for explaining an operation of the torque cam;

FIG. 9-1 is a view for explaining an operation of the flow control valve when a gear ratio is changed;

FIG. 9-2 is a view for explaining an operation of the flow control valve when a gear ratio is changed;

FIG. 9-3 is a view for explaining an operation of the flow control valve when a gear ratio is changed;

FIG. 13-1 is a view showing another configuration of the flow control valve;

FIG. 13-2 is a view for explaining an operation of the flow control valve shown in FIG. 13-1;

FIG. 13-3 is a view for explaining an operation of the flow control valve shown in FIG. 13-1;

FIG. 14-1 is a view showing another configuration of the flow control valve; and FIG. 14-2 is a view for explaining an operation of the flow control valve shown in FIG. 14-1.

EXPLANATIONS OF LETTERS OF NUMERALS

| | |
|---|---|
| 1 | Belt-type continuously variable transmission |
| 10 | Internal combustion engine (driving source) |
| 20 | Transaxle |
| 30 | Torque converter |
| 40 | Advance/retreat changing mechanism |
| 50 | Primary pulley |
| 51 | Primary pulley shaft |
| 51a, b | Working oil channel |
| 51c, d | Communication channel |
| 51e | Spline |
| 52 | Primary stationary sheave |
| 53 | Primary movable sheave |
| 53a | Cylindrical portion |
| 53b | Annular portion |
| 53c | Spline |
| 53d | Projecting portion |
| 54 | Primary partitioning wall |
| 54a | Communication channel |
| 54b | Communication channel |
| 55 | Primary hydraulic chamber (positioning hydraulic chamber) |
| 56 | Working fluid supplying shaft |
| 56a | Working oil channel |
| 56b | Communication hole |
| 60 | Secondary pulley |
| 70 | Flow control valve |
| 71 | First port |
| 72 | Second port |
| 73 | Working fluid channel |
| 73a | First-port-side channel |
| 73b | Second-port-side channel |
| 73c | Step |
| 73d | Recess |
| 73e | Closing member |
| 73f | Locking member |
| 74 | Check valve |
| 74a | Valve body |
| 74b | Valve seat |
| 74c | Elastic member |
| 74d | Tapered face |
| 75 | Guide member |
| 75a | Guide-side tapered face |
| 75b | Communicating portion |
| 75c | Communicating portion |
| 76 | Spool |
| 76a | Main body |
| 76b | Projecting portion |
| 76c | Narrow portion |
| 77 | Cylinder |
| 77a | Step |
| 77b | Elastic member |
| 78 | Third port |
| 79 | Drive pressure chamber |
| 80 | Final decelerator |
| 90 | Power transmission path |
| 100 | Belt |
| 110 | Wheel |
| 120 | Working-oil supply control device |
| T1 to T5 | Space |

BEST MODE FOR CARRYING OUT THE INVENTION

The present invention will be explained in detail with reference to the drawings. It is to be noted that the present invention is not limited to the embodiments described below. The constituents in the embodiments described below include those that can easily be conceived of by a person skilled in the art or those substantially the same. An internal combustion engine (gasoline engine, diesel engine, LPG engine, etc.) is used for a driving source that generates a driving force transmitted to the belt-type continuously variable transmission in the embodiments described below, but the invention is not limited thereto. An electric motor such as a motor may be used as the driving source.

In the embodiments described below, a primary pulley is defined as a rotor having a flow control valve, and a hydraulic chamber that presses a primary movable sheave toward a primary stationary sheave is defined as a positioning hydraulic chamber. However, a secondary sheave may be used as a rotor, and a hydraulic chamber that presses a secondary movable sheave of the secondary pulley toward a secondary stationary sheave may be used as a positioning hydraulic chamber.

EMBODIMENTS

Figure 1:
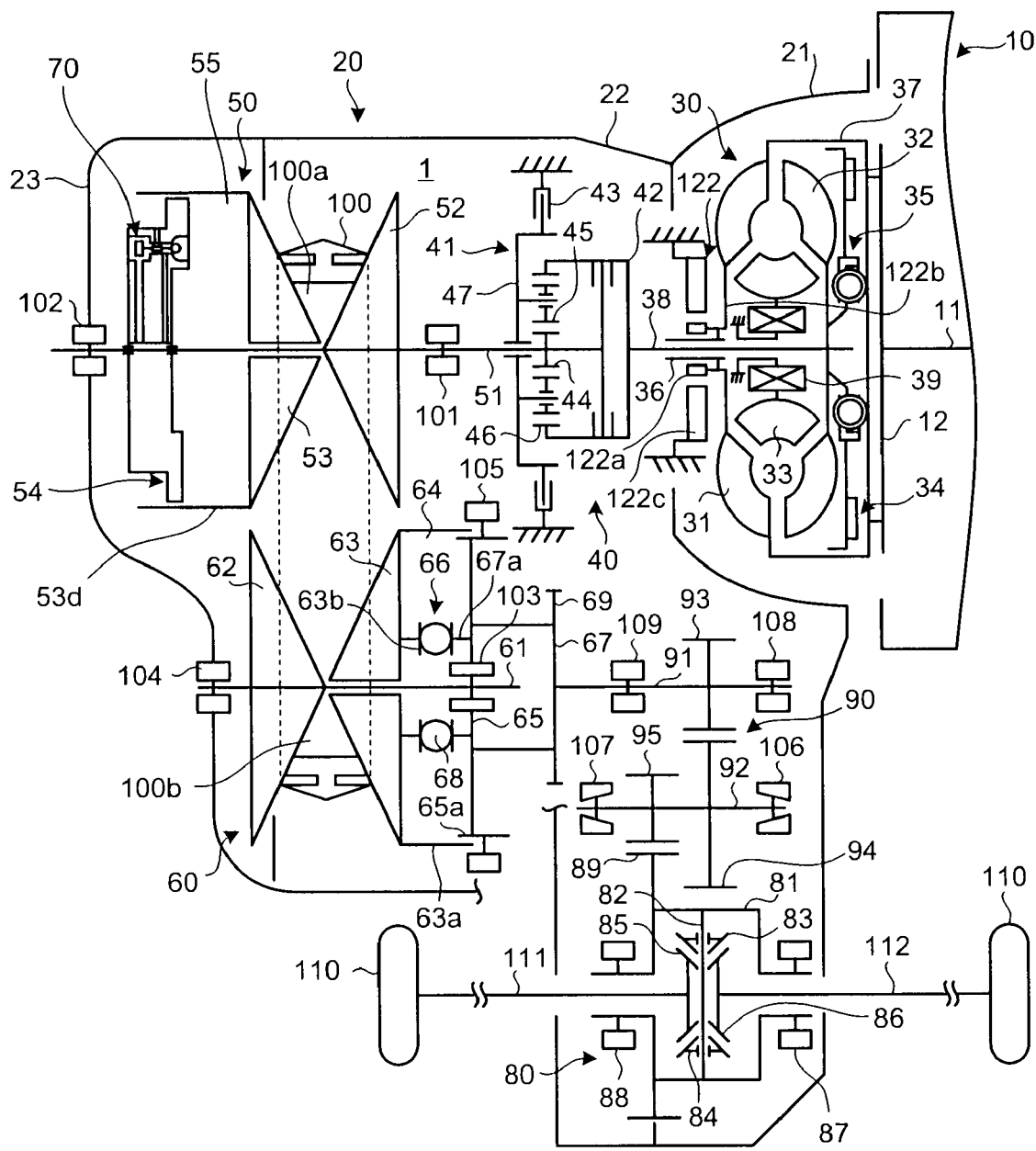
FIG. 1 is a skeleton diagram of a belt-type continuously variable transmission according to the present invention.
Figure 2:
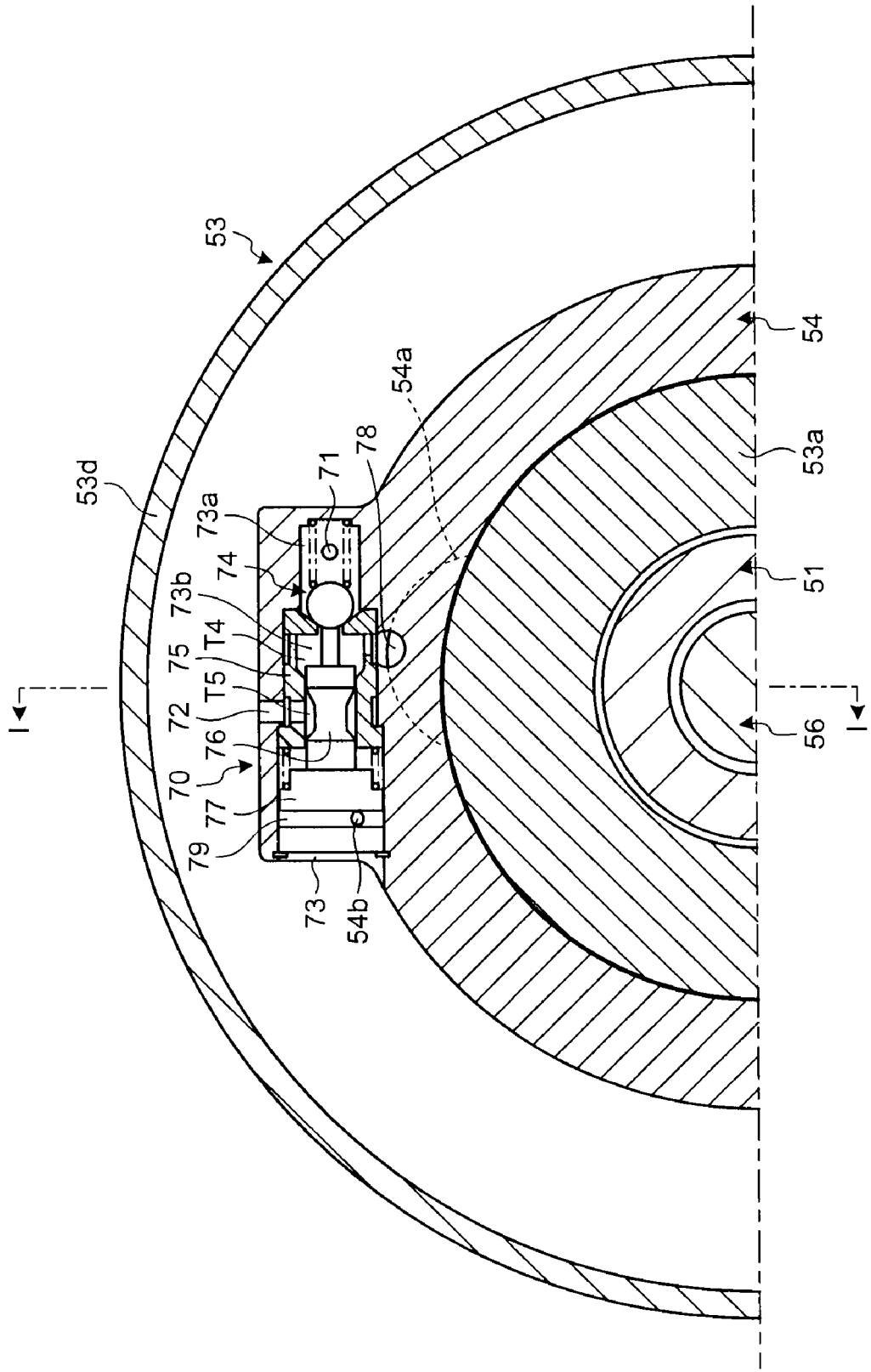
FIG. 2 is a sectional view of an essential part of a primary pulley.
Figure 3:
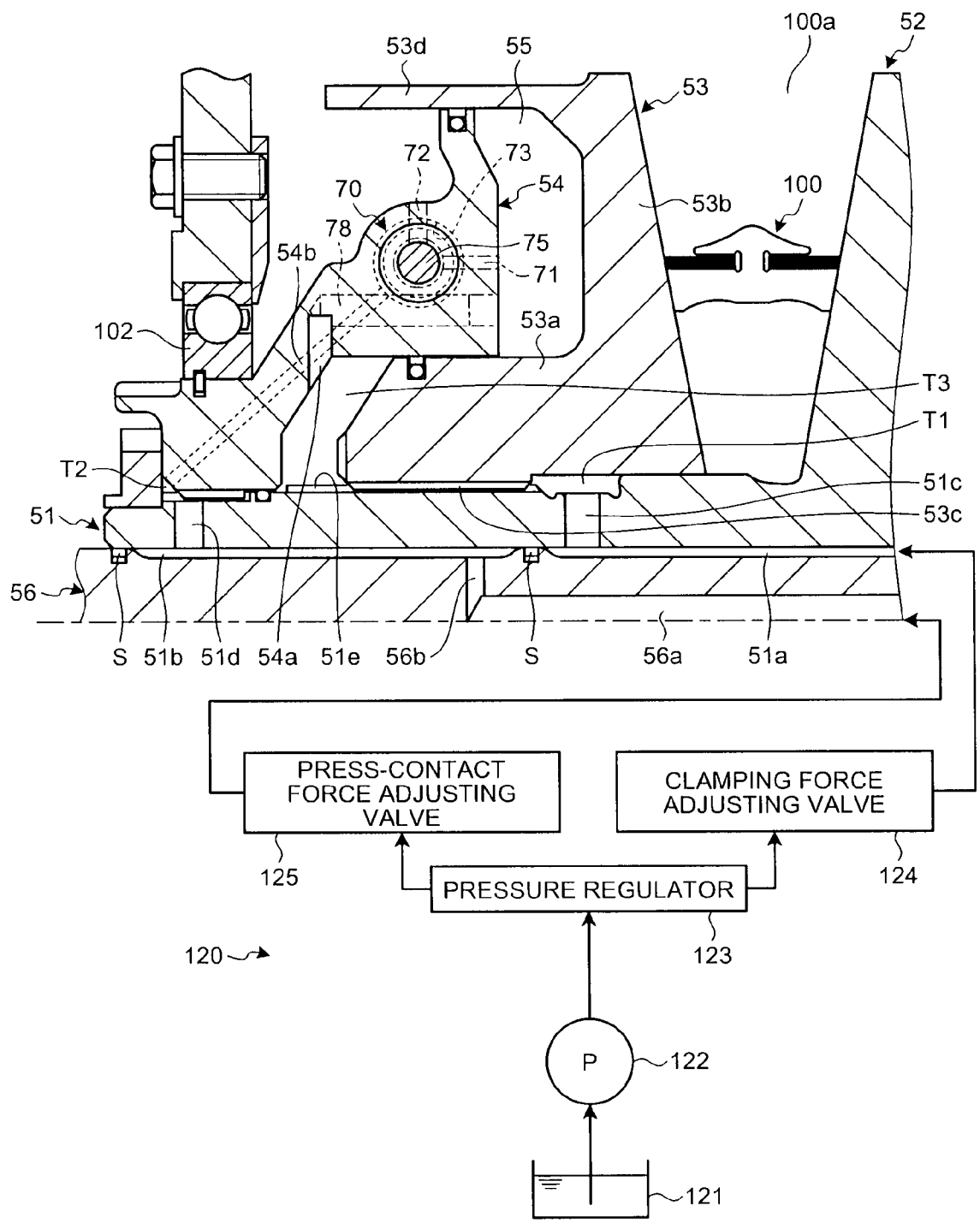
FIG. 3 is a sectional view of an essential part (sectional view along I-I in FIG. 2) of the primary pulley.
Figure 4:
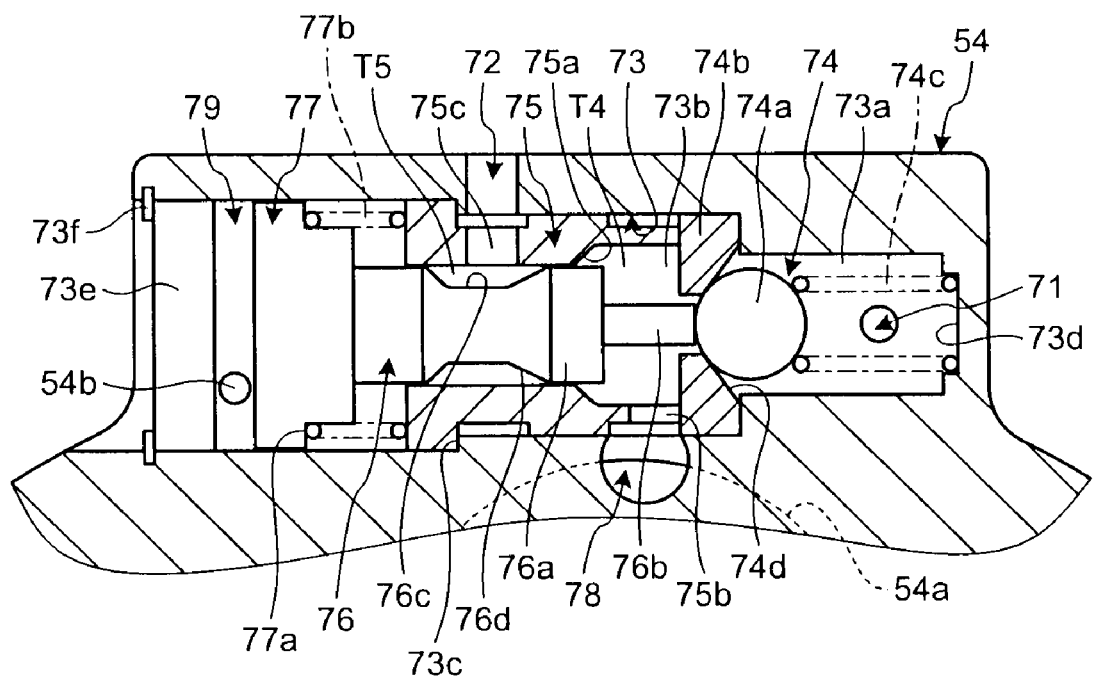
FIG. 4 is a view showing an example of a configuration of a flow control valve.
Figures 1, 5:
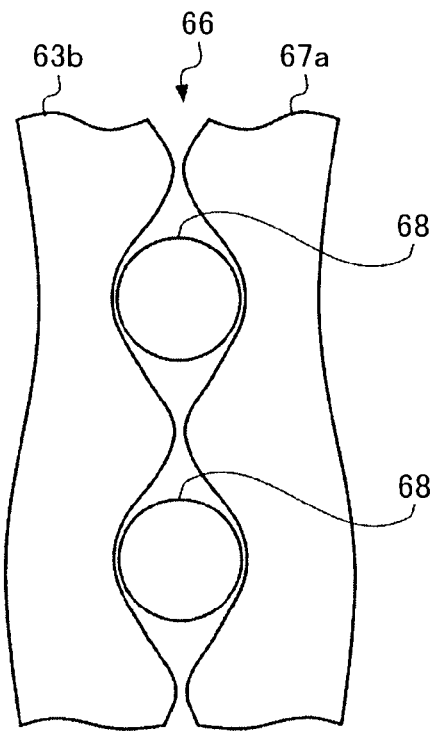
Figures 2, 5:
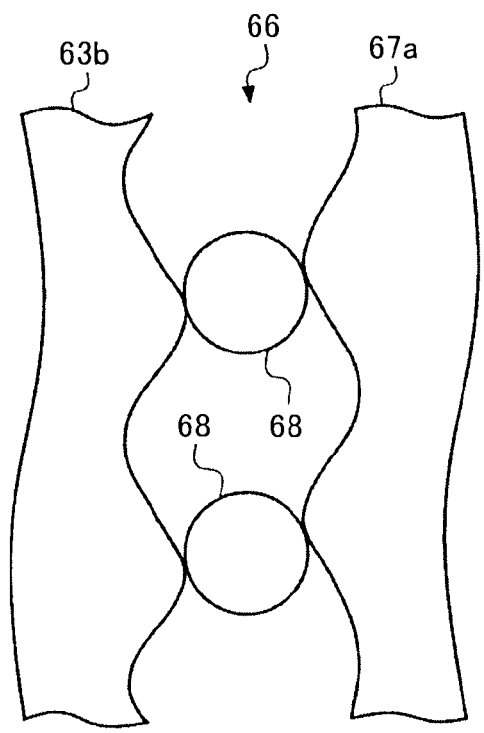
Figure 6:
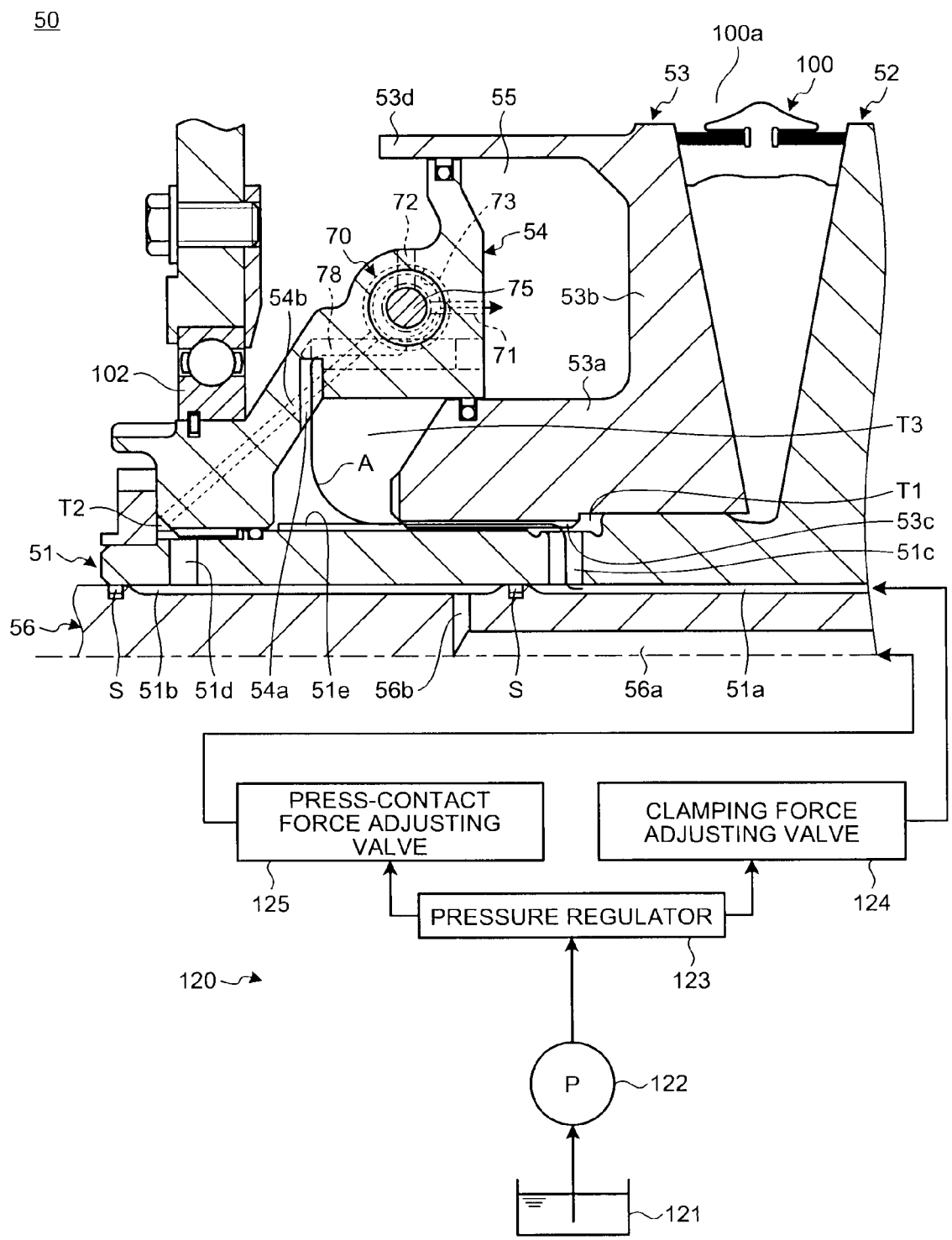
FIG. 6 is a view for explaining an operation of a belt-type continuously variable transmission when a gear ratio is changed.
Figure 7:
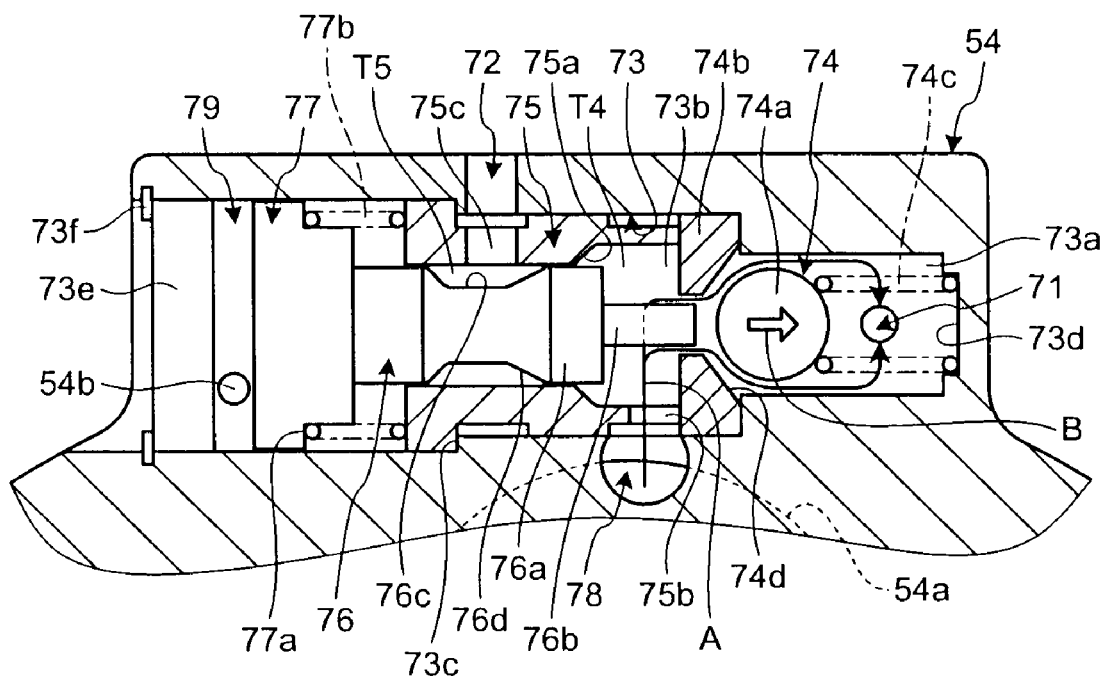
FIG. 7 is a view for explaining an operation of the flow control valve when a gear ratio is changed.
Figure 8:
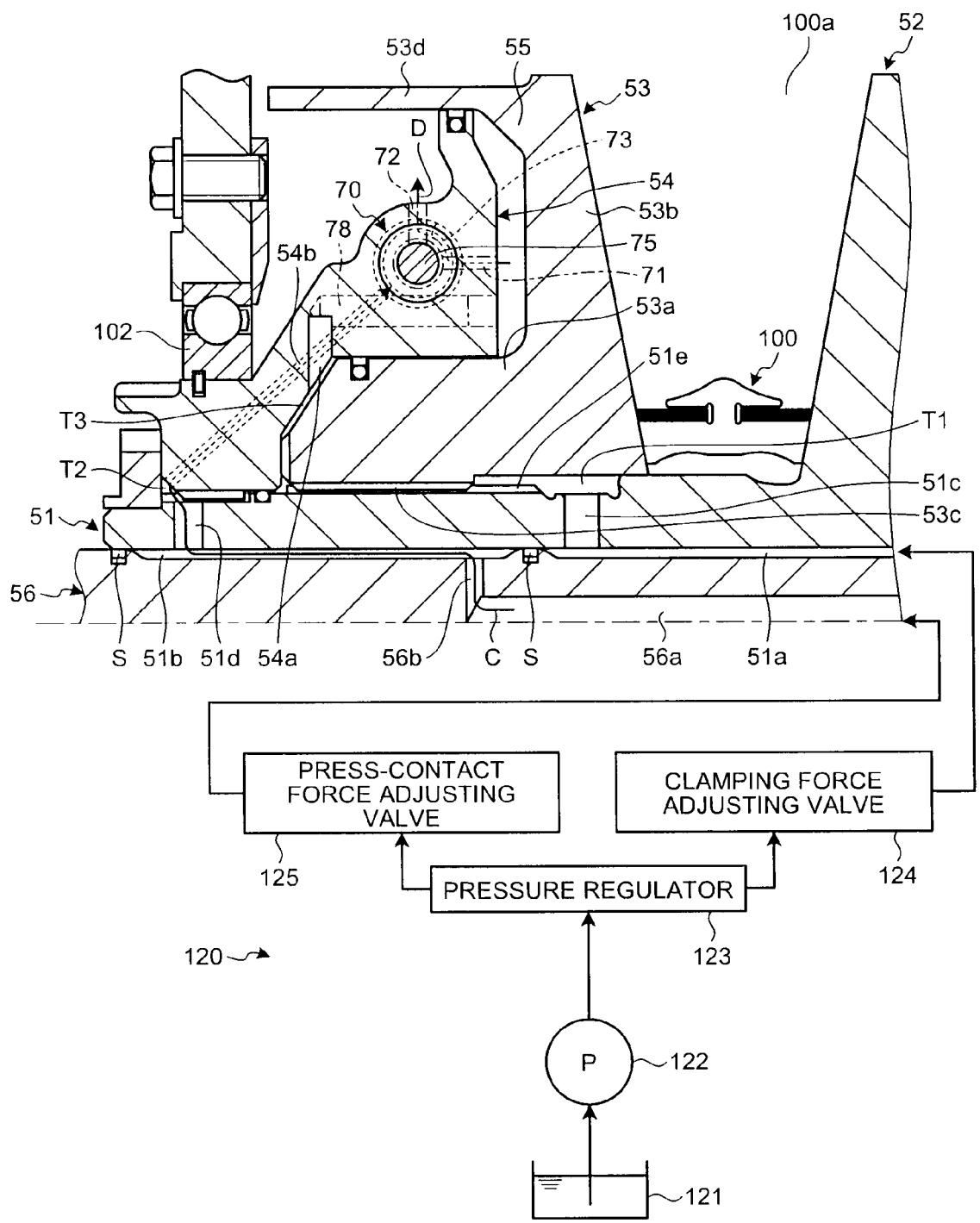
FIG. 8 is a view for explaining an operation of the belt-type continuously variable transmission when a gear ratio is changed.
Figures 1, 9:
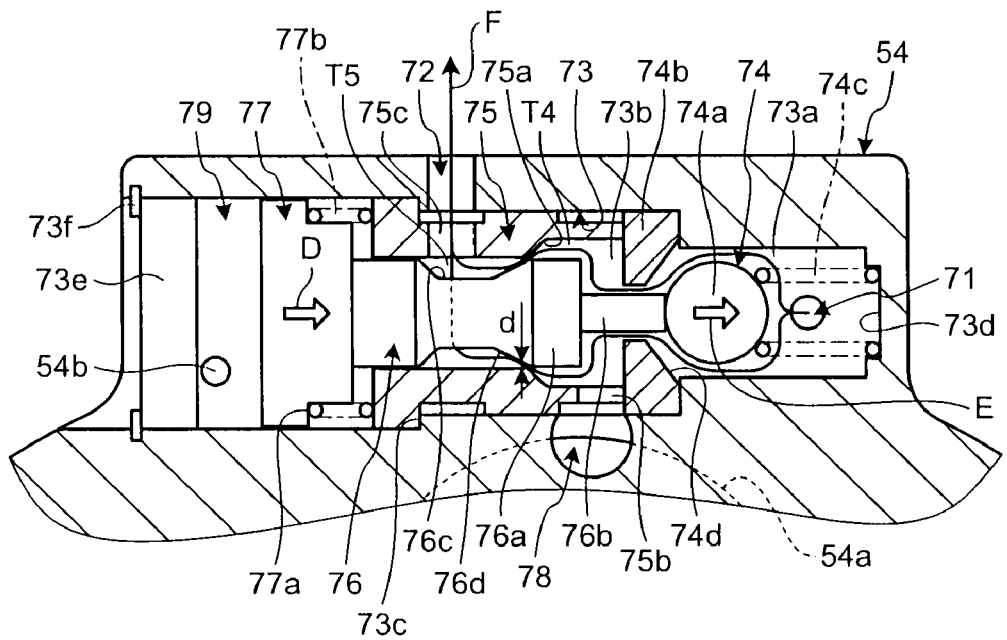
Figures 2, 9:
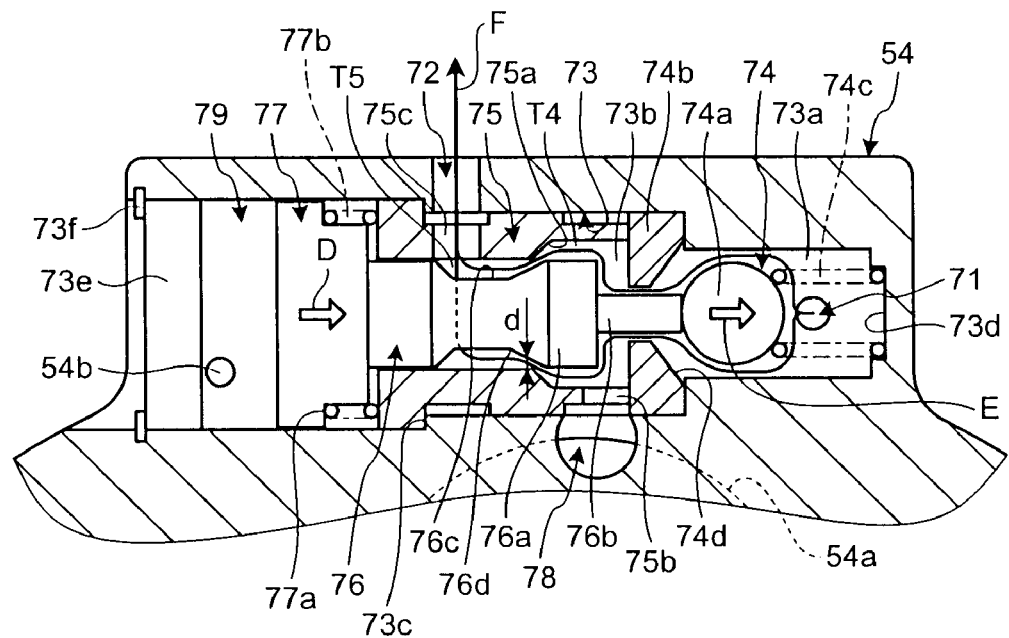
Figures 3, 9:
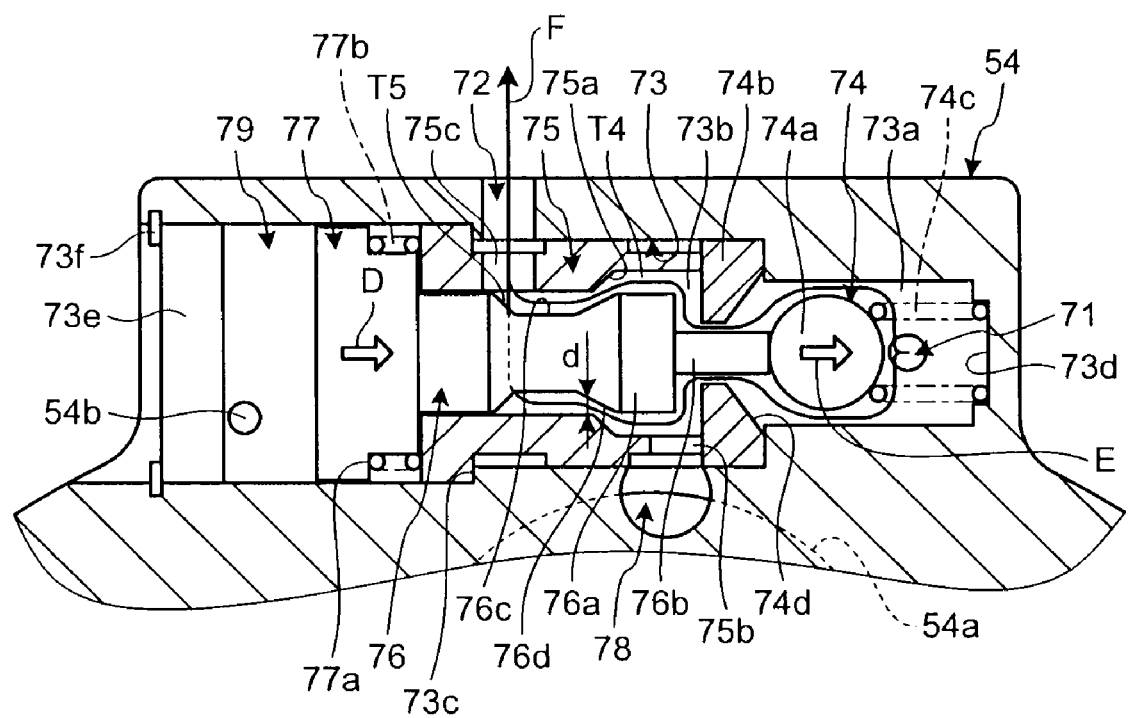
Figure 10:
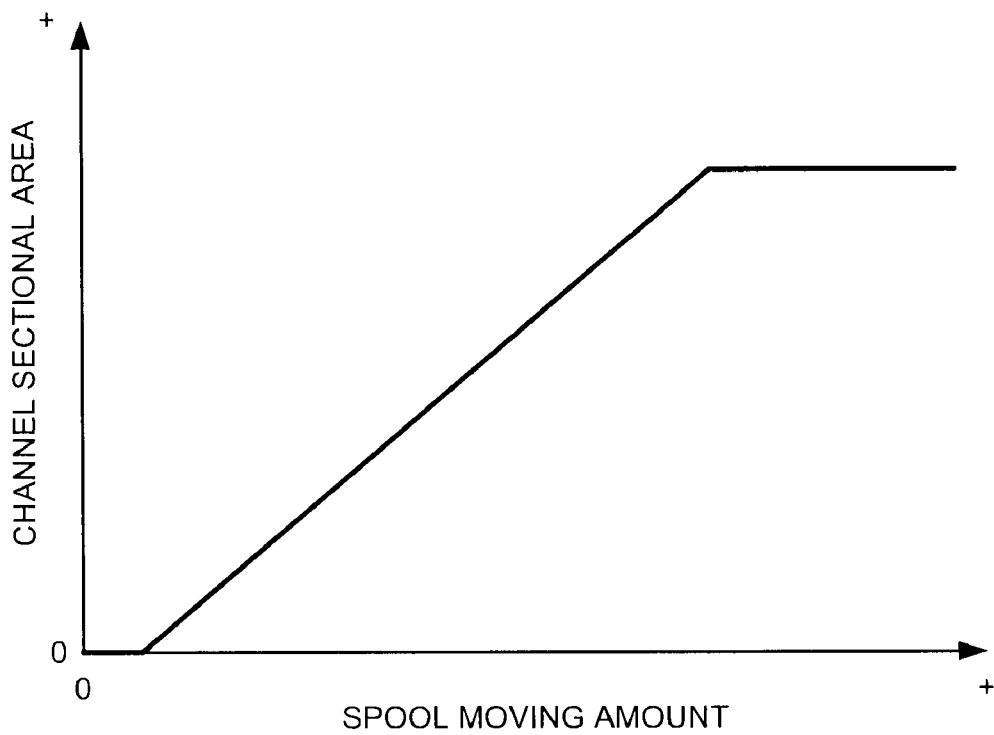
FIG. 10 is a view showing a relationship between a channel sectional area and a spool moving amount.
Figure 11:
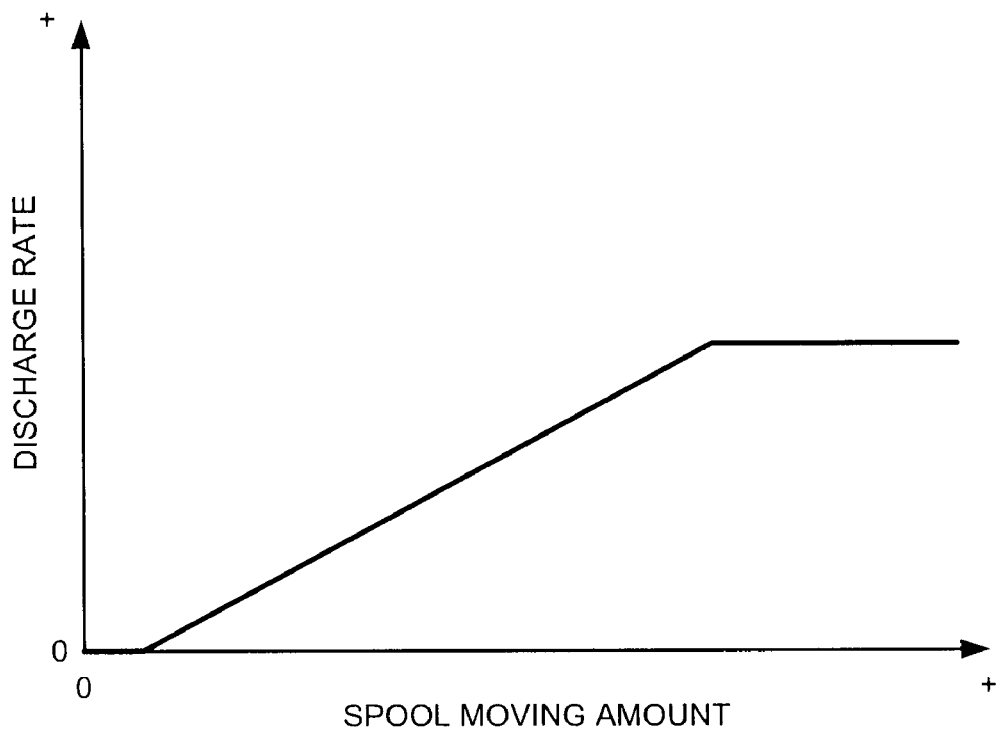
FIG. 11 is a view showing a relationship between a discharge rate and a spool moving amount.
Figure 12:
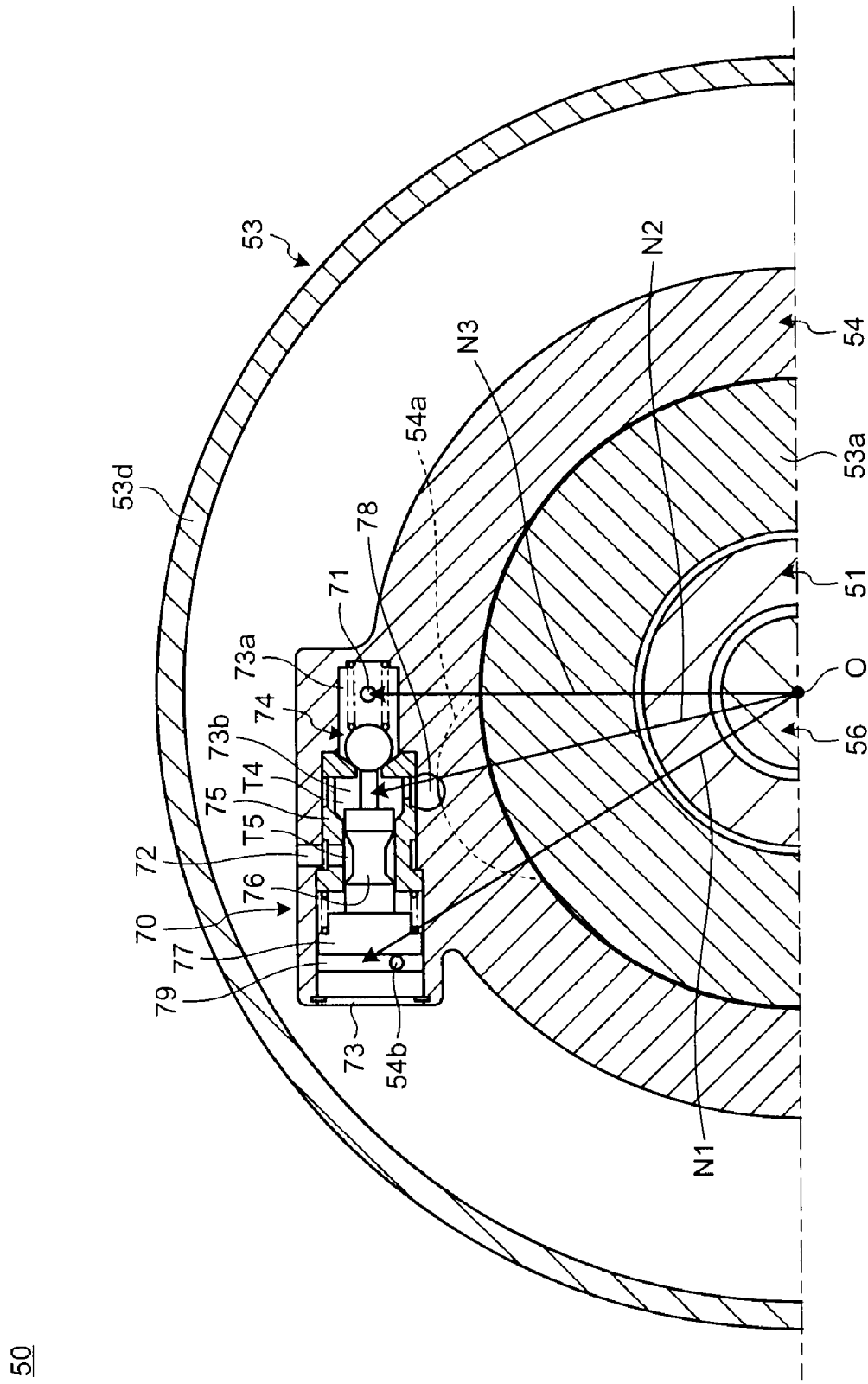
FIG. 12 is a sectional view of other essential part of the primary pulley.
Figures 1, 13:
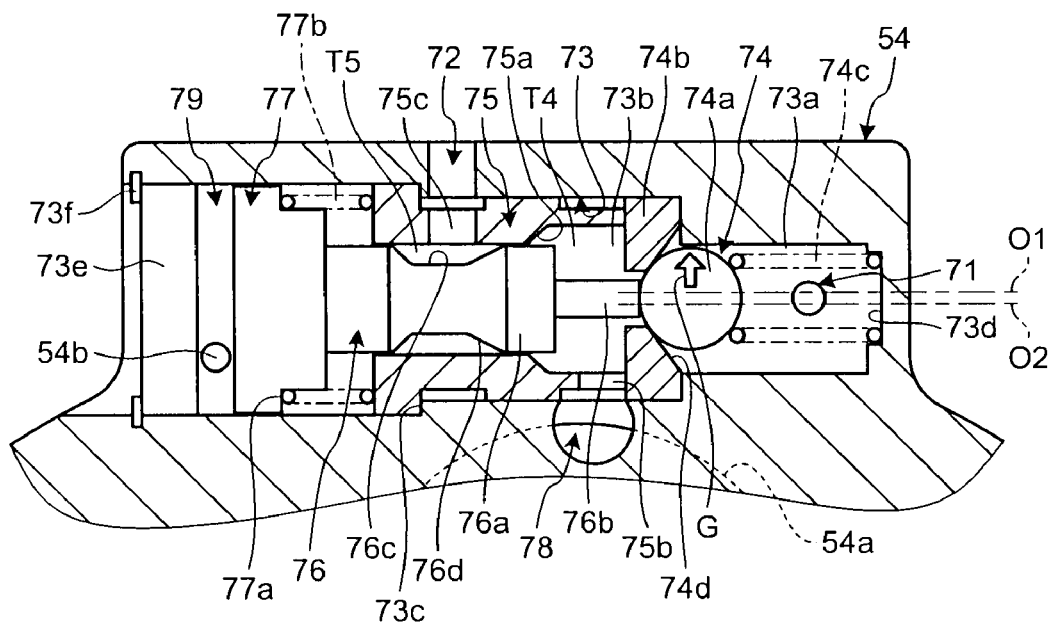
Figures 2, 13:
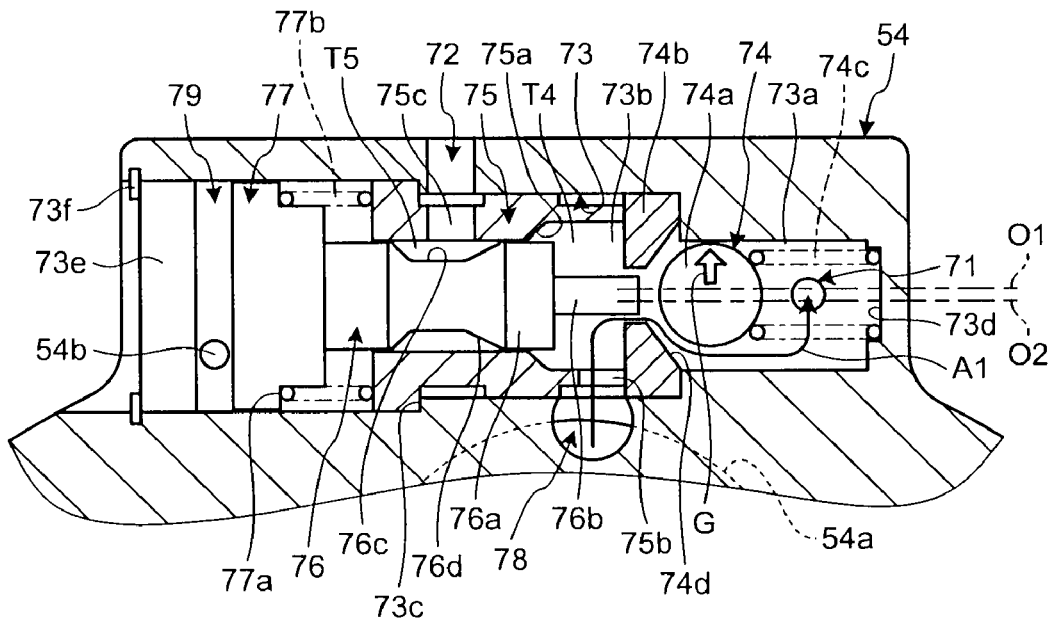
Figures 3, 13:
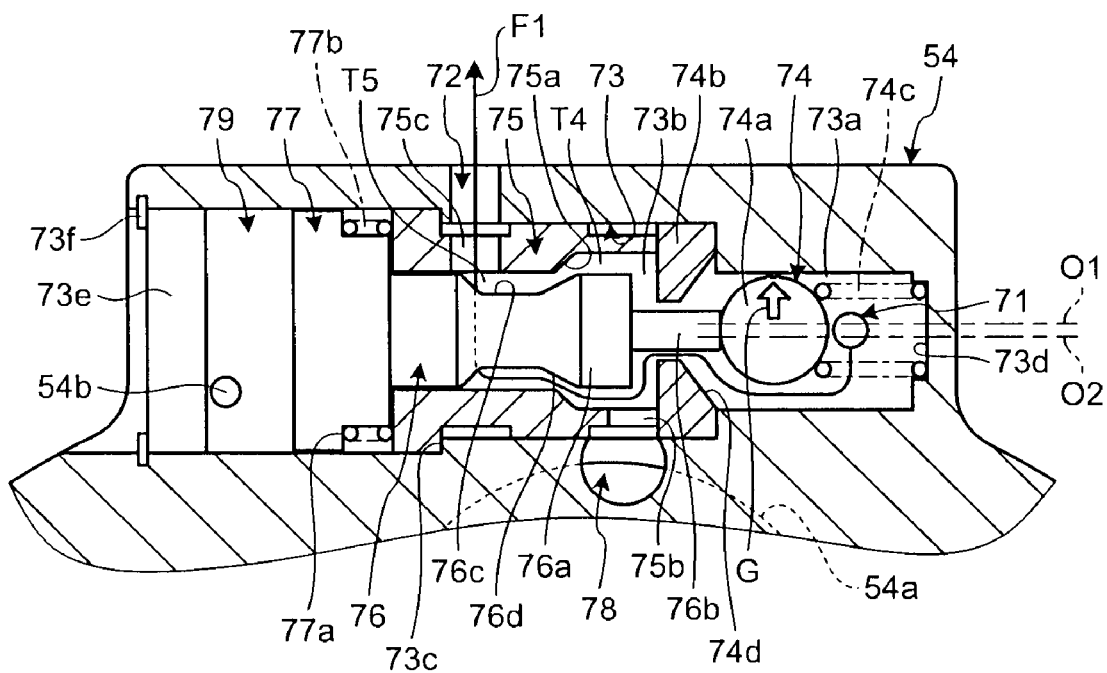
Figures 1, 14:
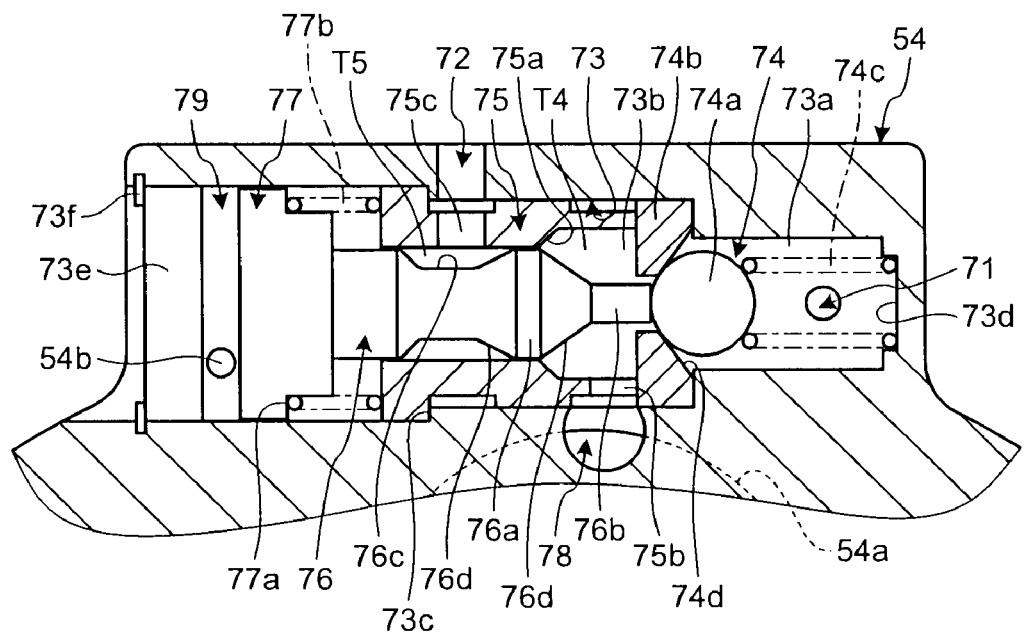
Figures 2, 14:
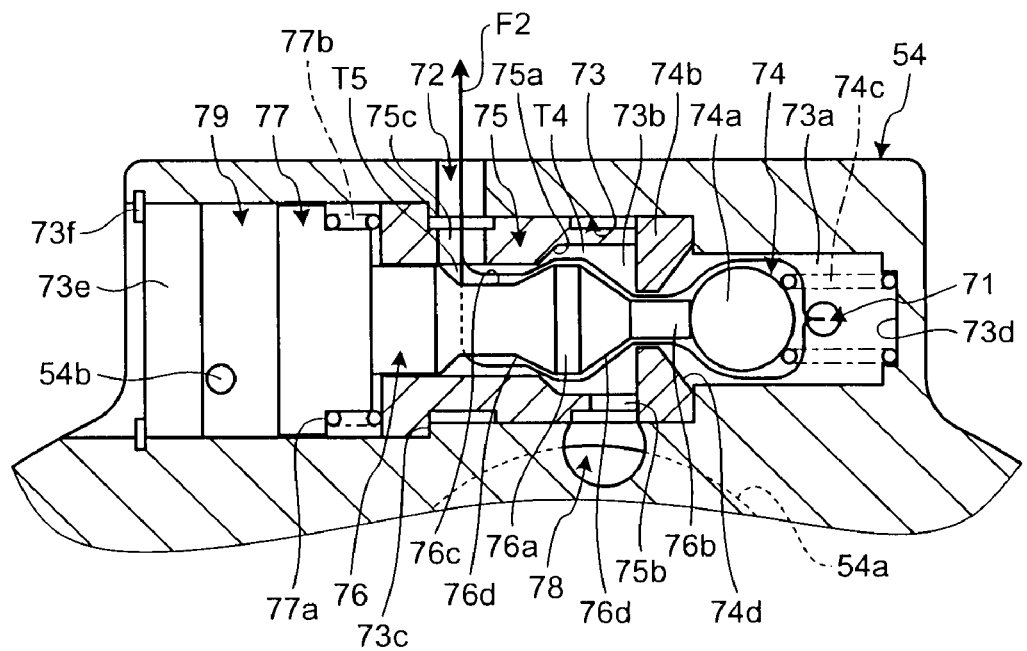

FIG. 1 is a skeleton diagram of a belt-type continuously variable transmission according to the present invention. FIG. 2 is a sectional view of an essential part of a primary pulley. FIG. 3 is a sectional view along I-I in FIG. 2. FIG. 4 is a view showing an example of a configuration of a flow control valve. FIG. 5-1 is a view showing a torque cam. FIG. 5-2 is a view for explaining an operation of the torque cam. FIG. 6 is a view for explaining an operation of the belt-type continuously variable transmission when a gear ratio is changed. FIG. 7 is a view for explaining an operation of the flow control valve when a gear ratio is changed. FIG. 8 is a view for explaining an operation of the belt-type continuously variable transmission when a gear ratio is changed. FIGS. 9-1 to 9-3 are explanatory views of an operation of the flow control valve when a gear ratio is changed. FIG. 10 is a view showing a relationship between a channel sectional area and a moving amount of a spool. FIG. 11 is a view showing a relationship between a discharge rate and a moving amount of a spool. FIG. 12 is a sectional view of other essential part of the primary pulley. FIGS. 13-1 to 13-3 are views showing another configuration of the flow control valve. FIGS. 14-1 and 14-2 are views showing an operation of a flow control valve.

As shown in FIG. 1, a transaxle 20 is arranged at the output side of an internal combustion engine 10. The transaxle 20 is composed of a transaxle housing 21, a transaxle case 22 attached to the transaxle housing 21, and a transaxle rear cover 23 attached to the transaxle case 22.

A torque converter 30 is housed in the transaxle housing 21. On the other hand, in a case composed of the transaxle case 22 and the transaxle rear cover 23, a primary pulley 50 and a secondary pulley 60 that are two pulleys constituting a belt-type continuously variable transmission 1 according to the present invention, a primary hydraulic chamber 55 that is a positioning hydraulic chamber, a secondary hydraulic chamber 64, a flow control valve 70 according to the present invention, and a belt 10 are housed. Numeral 40 denotes an advance/retreat changing mechanism, 80 denotes a final decelerator that transmits a driving force of the internal combustion engine 10 to a wheel 110, 90 denotes a power transmission path, and 120 denotes a working-oil supply control device (see FIGS. 3, 6 and 8).

The torque converter 30, which is a starting mechanism, transmits the driving force from the driving source, i.e., the output torque from the internal combustion engine 10, to the belt-type continuously variable transmission 1 as unchanged or increased, as shown in FIG. 1. The torque converter 30 is composed of at least a pump (pump impeller) 31, a turbine (turbine impeller) 32, a stator 33, a lock-up clutch 34, and a damper gear 35.

The pump 31 is mounted to a hollow shaft 36 that can rotate about an axis same as that of a crankshaft 11 of the internal combustion engine 10. Specifically, the pump 31 can rotate about the axis same as that of the crankshaft 11 together with the hollow shaft 36. The pump 31 is also connected to a front cover 37. The front cover 37 is coupled to the crankshaft 11 through a drive plate 12 of the internal combustion engine 10.

The turbine 32 is arranged so as to be opposite to the pump 31. The turbine 32 is arranged in the hollow shaft 36, and attached to an input shaft 38 that can rotate about the axis same as that of the crankshaft 11. Specifically, the turbine 32 can rotate about the axis same as that of the crankshaft 11 together with the input shaft 38.

A stator 33 is arranged between the pump 31 and the turbine 32 via a one-way clutch 39. The one-way clutch 39 is fixed to the transaxle housing 21. A lock-up clutch 34 is arranged between the turbine 32 and the front cover 37, wherein the lock-up clutch 34 is coupled to the input shaft 38 through the damper gear 35. A working oil, which is a working fluid, is supplied from a working-oil supply control device 120 to the casing composed of the pump 31 and the front cover 37.

The operation of the torque converter 30 will be explained. The output torque from the internal combustion engine 10 is transmitted to the front cover 37 from the crankshaft 11 through the drive plate 12. When the lock-up clutch 34 is released by the damper gear 35, the output torque from the internal combustion engine 10 transmitted to the front cover 37 is transmitted to the pump 31, and then, transmitted to the turbine 32 through the working oil circulating between the pump 31 and the turbine 32. The output torque from the internal combustion engine 10 transmitted to the turbine 32 is transmitted to the input shaft 38. Specifically, the torque converter 30 increases the output torque from the internal combustion engine 10 and transmits the same to any one of later-described belt-type continuously variable transmissions 1 through the input shaft 38. In this case, the flow of the working oil circulating between the pump 31 and the turbine 32 is changed by the stator 33 so as to obtain a predetermined torque characteristic.

On the other hand, when the lock-up clutch 34 is locked (engaged with the front cover 37) by the damper gear 35, the output torque from the internal combustion engine 10 transmitted to the front cover 37 is directly transmitted to the input shaft 38, not via the working oil. Specifically, the torque converter 30 transmits the output torque from the internal combustion engine 10 to the later-described belt-type continuously variable transmission 1 as unchanged via the input shaft 38.

An oil pump 122 is provided between the torque converter 30 and the later-described advance/retreat changing mechanism 40. The oil pump 122 is composed of a rotor 122a, hub 122b, and body 122c. The oil pump 122 is connected to the pump 31 by the rotor 122a through the cylindrical hub 122b. The body 122c is fixed to the transaxle case 22. The hub 122b is spline-fitted to the hollow shaft 36. Therefore, the oil pump 122 can be driven, since the output torque from the internal combustion engine 10 is transmitted to the rotor 122 through the pump 31.

The advance/retreat changing mechanism 40 transmits the output torque from the internal combustion engine 10 transmitted through the torque converter 30 to the primary pulley 50 of any one of the later-described belt-type continuously variable transmissions 1 as shown in FIG. 1. The advance/retreat changing mechanism 40 is composed of at least a planetary gear drive 41, forward clutch 42 and reverse brake 43.

The planetary gear drive 41 is composed of a sun gear 44, a pinion 45, and a ring gear 46.

The sun gear 44 is spline-fitted to an unillustrated coupling member. The coupling member is spline-fitted to the primary pulley shaft 51 of the primary pulley 50 described later. Therefore, the output torque from the internal combustion engine 10 transmitted to the sun gear 44 is transmitted to the primary pulley shaft 51.

The pinion 45 is meshed with the sun gear 44, and plural pinions (three, for example) are arranged around the sun gear 44. Each pinion 45 is held by a changeover carrier 47 that revolvably and integrally supports each pinion around the sun gear 44. The changeover carrier 47 is connected to the reverse brake 43 at its outer peripheral end.

The ring gear 46 is meshed with each pinion 45 held by the changeover carrier 47, and connected to the input shaft 38 of the torque converter 30 through the forward clutch 42.

The forward clutch 42 is on/off controlled by the working oil supplied to an unillustrated hollow portion of the input shaft 38 from unillustrated working-oil supply control device. When the forward clutch 42 is turned off, the output torque from the internal combustion engine 10 transmitted to the input shaft 38 is transmitted to the ring gear 46. On the other hand, when the forward clutch 42 is turned on, the ring gear 46, the sun gear 44, and each pinion 45 are not relatively rotated, so that the output torque from the internal combustion engine 10 transmitted to the input shaft 38 is directly transmitted to the sun gear 44.

The reverse brake 43 is on/off controlled by a brake piston, not shown, to which the working oil is supplied from the unillustrated working-oil supply control device. When the reverse brake 43 is turned on, the changeover carrier 47 is fixed to the transaxle case 22, so that each pinion 45 cannot revolve around the sun gear 44. When the reverse brake 43 is turned off, the changeover carrier 47 is released, so that each pinion 45 can revolve around the sun gear 44.

The primary pulley 50 of the belt-type continuously variable transmission 1 transmits the output torque, which is transmitted via the advance/retreat changing mechanism 40 from the internal combustion engine 10, to a secondary pulley 60 by a later-described belt 100. As shown in FIGS. 1 to 3, the primary pulley 50 is composed of a primary pulley shaft 51, a primary stationary sheave 52, a primary movable sheave 53, a primary portioning wall 54, and a primary hydraulic chamber 55 that is a positioning hydraulic chamber.

The primary pulley shaft 51 is rotatably supported by the bearings 101 and 102. The primary pulley shaft 51 is a hollow shaft, and a working fluid supply shaft 56 to which a working oil channel 56a is formed is arranged at the unillustrated hollow portion. The portion between the primary pulley shaft 51 and the working fluid supply shaft 56 is divided into working oil channels 51a and 51b by a sealing member S such as a seal ring. The working oil supplied to the primary hydraulic chamber 55 from the working-oil supply control device 120 flows into the working oil channel 51a. The working oil supplied from the working-oil supply control device 120 to a later-described drive pressure chamber 79 flows into the working fluid channel 51b through the working oil channel 56a and the communication hole 56b.

The primary pulley shaft 51 has a communication channel 51c that flows the working oil, which flows into the working oil channel 51a, into a space T1 formed between the primary movable sheave 53 and the primary pulley shaft 51. The primary pulley shaft 51 also has a communication channel 51d that flows the working oil, which flows into the working oil channel 51b, into a space T2 formed between the primary partitioning wall 54 and the primary pulley shaft 51.

The primary stationary sheave 52 is provided at the position opposite to the primary movable sheave 53 so as to rotate with the primary pulley shaft 51. Specifically, the primary stationary sheave 52 is formed as an annular portion projecting toward the outside in the diameter direction from the outer periphery of the primary pulley shaft 51. Specifically, in this embodiment, the primary stationary sheave 52 is integrally formed at the outer periphery of the primary pulley shaft 51.

The primary movable sheave 53 is composed of a cylindrical portion 53a and an annular portion 53b. Formed at the primary movable sheave 53 is an annular projecting portion 53d that projects in the other direction of the axial direction in the vicinity of the outer peripheral end of the annular portion 53b, i.e., projects toward the primary partitioning wall. The cylindrical portion 53a is formed about the axis same as the axis of the primary pulley shaft 51. The annular portion 53b is formed so as to project from the end portion of the cylindrical portion 53a at the side of the primary stationary sheave toward the outside in the diameter direction. The primary movable sheave 53 is supported slidably in the axial direction of the primary pulley shaft 51 by the spline-fitting between the spline 53c formed at the inner peripheral surface of the cylindrical portion 53a and the spline 51e formed at the outer peripheral surface of the primary pulley shaft 51. A V-shaped primary groove 100a is formed between the primary stationary sheave 52 and the primary movable sheave 53, i.e., between the surface of the unillustrated annular portion of the primary stationary sheave 52 opposite to the primary movable sheave 53 and the surface of the annular portion 53b of the primary movable sheave 53 opposite to the primary stationary sheave 52.

The working oil flowing into the space T1 passes between the primary movable sheave 53 and the primary pulley shaft 51, which are spline-fitted, and flows in a space T3 formed by the primary partitioning wall, the primary movable sheave 53 and the primary pulley shaft 51.

The primary partitioning wall 54 is arranged at the position opposite to the primary stationary sheave 52 across the primary movable sheave 53 in the axial direction. The primary partitioning wall 54 is mounted so as to rotate together with the primary pulley shaft 51. The primary partitioning wall 54 is an annular member, and a working fluid channel 73 of a flow control valve 70 is formed in the vicinity of the center in the diameter direction thereof.

The working fluid channel 73 has a cylindrical shape in which the other end is closed, and equally spaced at plural positions, i.e., three positions, on the circumference of the primary partitioning wall 54. The longitudinal direction of the working fluid channel 73 is formed to be orthogonal to the axial direction of the primary pulley 50 that is a rotor. Specifically, the longitudinal direction of the flow control valve 70 having the working fluid channel 73 is skew with respect to the axial direction of the primary pulley 50. Therefore, this can prevent the flow control valve 70 from projecting in the axial direction of the primary pulley 50, whereby the influence of the flow control valve 70 on the length of the primary pulley 50, which is a rotor, in the axial direction can be reduced. Accordingly, the increase in the length of the primary pulley 50 in the axial direction can be reduced, with the result that the primary pulley 50 can be miniaturized, and hence, the belt-type continuously variable transmission 1 can be miniaturized.

The working fluid channel 73 may be formed so as to project from the outer peripheral surface of the primary partitioning wall 54 toward the outside in the diameter direction. By virtue of this structure, the effect same as that obtained by forming a rib, which extends in the circumferential direction, on the outer peripheral surface of the primary partitioning wall 54 can be obtained, whereby the rigidity of the primary partitioning wall 54 can be enhanced. Therefore, the responsiveness of the belt-type continuously variable transmission 1 upon the shift and the durability can be enhanced.

If the longitudinal direction of the flow control valve 70 having the working fluid channel 73 is skew with respect to the axial direction of the primary pulley 50, the primary pulley 50, which is a rotor, can be miniaturized. Therefore, the longitudinal direction of the working fluid channel 73 may not be orthogonal to the axial direction of the primary pulley 50.

A communication channel 54a that communicates the third port 78 of the flow control valve 70 and the space T3 into which the working oil flows is formed to the primary partitioning wall 54. Further, a communication channel 54b that communicates the drive pressure chamber 79 of the flow control valve 70 and the space T2 into which the working oil flows is formed to the primary partitioning wall 54.

The primary hydraulic chamber 55 is a positioning hydraulic chamber that presses the primary movable sheave 53 toward the primary stationary sheave, and is a space formed by the primary movable sheave 53 and the primary partitioning wall 54. A seal member S such as a seal ring is disposed between the projecting portion 53d of the primary movable sheave 53 and the primary partitioning wall 54 and between the cylindrical portion 53a of the primary movable sheave 53 and the primary partitioning wall 54. Specifically, the space formed by the primary movable sheave 53 and the primary partitioning wall 54, which constitute the primary hydraulic chamber 55, is sealed by the seal member S.

The working oil flowing into the working oil channel 51a of the primary pulley shaft 51 is supplied to the primary hydraulic chamber 55. Specifically, the working oil is supplied to the primary hydraulic chamber 55, and the primary movable sheave 53 slides in the axial direction by the pressure of the supplied working oil, i.e., the pressure of the primary hydraulic chamber 55, so as to move the primary movable sheave 53 close to or apart from the primary stationary sheave 52. The primary movable sheave 53 is pressed toward the primary stationary sheave by the pressure of the primary hydraulic chamber 55, whereby the primary hydraulic chamber 55 generates a belt clamping force to the belt 100 that is looped around the primary groove 100a so as to change the position of the primary movable sheave 53 to the primary stationary sheave 52 in the axial direction. Thus, the primary hydraulic chamber 55 has a function as gear ratio changing means for changing a gear ratio.

The secondary pulley 60 of the belt-type continuously variable transmission 1 transmits the output torque from the internal combustion engine 10 transmitted to the primary pulley 50 by the belt 100 to the final decelerator 80 of the belt-type continuously variable transmission 1. As shown in FIG. 1, the secondary pulley 60 is composed of a secondary pulley shaft 61, a secondary stationary sheave 62, a secondary movable sheave 63, a secondary hydraulic chamber 64, a secondary partitioning wall 65, and a torque cam 66. Numeral 69 denotes a parking brake gear.

The secondary pulley shaft 61 is rotatably supported by bearings 103 and 104. The secondary pulley shaft 61 has an unillustrated working oil channel in its inside, and a working oil, which is a working fluid, supplied to the secondary hydraulic chamber 64 from the working-oil supply control device 120 flows into the working oil channel.

The secondary stationary sheave 62 is provided at the position opposite to the secondary movable sheave 63 so as to rotate with the secondary pulley shaft 61. Specifically, the secondary stationary sheave 62 is formed as an annular portion projecting toward the outside in the diameter direction from the outer periphery of the secondary pulley shaft 61. Specifically, in this embodiment, the secondary stationary sheave 62 is integrally formed at the outer periphery of the secondary pulley shaft 61.

The secondary movable sheave 63 is slidably supported in the axial direction of the secondary pulley shaft 61 by the spline-fitting between an unillustrated spline formed at its inner peripheral surface and an unillustrated spline formed at the outer peripheral surface of the secondary pulley shaft 61. A V-shaped secondary groove 100*b* is formed between the secondary stationary sheave 62 and the secondary movable sheave 63, i.e., between the surface of the secondary stationary sheave 62 opposite to the secondary movable sheave 63 and the surface of the secondary movable sheave 63 opposite to the secondary stationary sheave 62.

The secondary hydraulic chamber 64 presses the secondary movable sheave 63 to the secondary stationary sheave. As shown in FIG. 1, the secondary hydraulic chamber 64 is a space formed by the secondary movable sheave 63, and a disc-shaped secondary partitioning wall 65 fixed to the secondary pulley shaft 61. An annular projecting portion 63*a* that projects in one direction of the axial direction, i.e., projects toward the final decelerator 80, is formed to the secondary movable sheave 63. On the other hand, an annular projecting portion 65*a* that projects in the other direction of the axial direction, i.e., projects toward the secondary movable sheave 63, is formed to the secondary partitioning wall 65. Here, an unillustrated seal member such as a seal ring is provided between the projecting portion 63*a* and the projecting portion 65*a*. Specifically, the space formed by the secondary movable sheave 63 and the secondary partitioning wall 65, which constitute the secondary hydraulic chamber 64, is sealed by the unillustrated seal member.

The working oil flowing into the unillustrated working oil channel of the secondary pulley shaft 61 from the working-oil supply control device 120 via an unillustrated working fluid supply hole is supplied to the secondary hydraulic chamber 64. Specifically, the working oil is supplied to the secondary hydraulic chamber 64, and the secondary movable sheave 63 slides in the axial direction by the pressure of the supplied working oil, i.e., the pressure of the secondary hydraulic chamber 64, so as to move the secondary movable sheave 63 close to or apart from the secondary stationary sheave 62. The secondary movable sheave 63 is pressed toward the secondary stationary sheave by the pressure of the secondary hydraulic chamber 64, whereby the secondary hydraulic chamber 64 generates a secondary-side belt clamping force to the belt 100 that is looped around the secondary groove 100*b* so as to keep the contact radius of the belt 100 to the primary pulley 50 and the secondary pulley 60 constant.

As shown in FIG. 5-1, the torque cam 66 is composed of a first engagement portion 63*b* having a peak and valley shape and annularly provided to the secondary movable sheave 63 of the secondary pulley 60, a second engagement portion 67*a* formed to an intermediate member 67, described later, opposite to the first engagement portion 63*b* in the axial direction of the secondary pulley 61, and plural disc-shaped transmission members 68 arranged between the first engagement portion 63*b* and the second engagement portion 67*a*.

The intermediate member 67 is formed integral with the secondary partitioning wall 65 or is fixed to the secondary partitioning wall 65, and supported by the bearings 103 and 105 so as to be rotatable relative to the secondary pulley shaft 61 or the secondary movable sheave 63 on the secondary pulley shaft 61. The intermediate member 67 is spline-fitted to an input shaft 91 of the power transmission path 90. Specifically, the output torque from the internal combustion engine 10 transmitted to the secondary pulley 60 is transmitted to the power transmission path 90 via the intermediate member 67.

The operation of the torque cam 66 will be explained. When the output torque from the internal combustion engine 10 is transmitted to the primary pulley 50 and the primary pulley 50 rotates, the secondary pulley 60 rotates through the belt 100. In this case, since the secondary movable sheave 63 of the secondary pulley 60 rotates with the secondary stationary sheave 62, the secondary pulley shaft 61, and the bearing 103, a relative rotation is produced between the secondary movable sheave 63 and the intermediate member 67. Then, the state is changed from the state in which the first engagement portion 63*b* and the second engagement portion 67*a* are close to each other as shown in FIG. 5-1 to the state in which the first engagement portion 63*b* and the second engagement portion 67*a* are apart from each other as shown in FIG. 5-2 by the plural transmission members 68. Thus, the torque cam 66 generates to the secondary pulley 60 a secondary-side belt clamping force to the belt 100.

Specifically, the secondary pulley 60 can be provided with the torque cam 66, in addition to the secondary hydraulic chamber 64, as belt clamping force generating means. This torque cam 66 mainly generates the secondary-side belt clamping force, and the secondary hydraulic chamber 64 complements the secondary-side belt clamping force generated by the torque cam 66. The belt clamping force generating means of the secondary pulley 60 may only be the secondary hydraulic chamber 64.

As shown in FIGS. 2 to 4, the flow control valve 70 supplies the working oil, which is the working fluid, to the primary hydraulic chamber 55 from the outside of the primary hydraulic chamber 55, which is the positioning hydraulic chamber, i.e., from the outside of the primary pulley 50, discharges the working oil from the primary hydraulic chamber 55 to the outside of the primary pulley 50, and retains the working oil in the primary hydraulic chamber 55. In the present embodiment, the flow control valve 70 is provided so as to correspond to the working fluid channel 73 formed to the primary partitioning wall 54 of the primary pulley 50 that is a rotor. Specifically, the flow control valve 70 is equally spaced at plural positions, e.g., three positions, on the circumference of the primary partitioning wall 54. The flow control valve 70 is composed of a first port 71, a second port 72, the working fluid channel 73, a check valve 74, a guide member 75, a spool 76, a cylinder 77, a third port 78, and a drive pressure chamber 79.

The first port 71 is formed to the working fluid channel 73 of the primary partitioning wall 54 at the side of the primary movable sheave so as to be parallel to the direction orthogonal to the longitudinal direction of the working fluid channel 73, i.e., so as to be parallel to the axial direction of the primary pulley 50. One end of the first port 71 is open at the vicinity of the other end of the working fluid channel 73, i.e., at the first-port-side channel 73a described below, while the other end thereof is open to the primary hydraulic chamber 55 of the primary pulley 50. Specifically, the first port 71 communicates the first-port-side channel 73a of the flow control valve 70 with the primary hydraulic chamber 55.

The second port 72 is formed to the working fluid channel 73 of the primary partitioning wall 54 at the outside in the diameter direction of the working fluid channel 73 so as to be parallel to the direction orthogonal to the longitudinal direction of the working fluid channel 73, i.e., so as to be parallel to the diameter direction of the primary pulley 50. One end of the second port 72 is open at the center of the working fluid channel 73, i.e., at the second-port-side channel 73b described below, while the other end thereof is open to the outer peripheral surface of the primary partitioning wall 54. Specifically, the second port 72 communicates the second-port-side channel 73b of the flow control valve 70 with the outside of the primary pulley 50.

The working oil, which is the working fluid, passes through the working fluid channel 73. A step 73c is formed at the center of the working fluid channel 73. The first-port-side channel 73a is formed at the side of the other end from the step 73c, and the second-port-side channel 73b is formed at the side of one end thereof. A recess 73d that locks the other end of a later-described elastic member 74c of the check valve 74 is formed at the other end. Numeral 73e denotes a closing member for closing one end of the working fluid channel 73. Numeral 73f denotes a locking member that locks the closing member 73e to the one end (left side in FIG. 4) of the working fluid channel 73 that is open.

The check valve 74 is arranged in the working fluid channel 73, and partitions the working fluid channel 73 into the first-port-side channel 73a and the second-port-side channel 73b. The check valve 74 is composed of a valve body 74a, a valve seat 74b, and an elastic member 74c. The valve body 74a has a spherical shape, and has a diameter larger than the inner diameter of the valve seat 74b. The valve seat 74b is arranged with the other surface thereof coming in contact with the step 73c of the working fluid channel 73. The valve seat 74b has a ring shape, and has a valve seat tapered face 74d formed on the other surface in the axial direction, wherein the diameter of the tapered face is decreased from the other surface toward one surface (from the first port side toward the second port side). The valve body 74a is brought into contact with the tapered face 74d of the valve seat, whereby the communication between the first-port-side channel 73a and the second-port-side channel 73b is blocked, i.e., the check valve 74 is closed. When the valve body 74a is apart from the tapered face 74d of the valve seat, the first-port-side channel 73a and the second-port-side channel 73b communicate with each other, i.e., the check valve 74 is opened. Specifically, the check valve 74 is opened from the second-port-side channel 73b toward the first-port-side channel 73a in the working fluid channel 73. The elastic member 74c is arranged and biased between the valve body 74a and the recess 73d of the working fluid channel 73. The elastic member 74c generates a biasing force in the direction in which the valve body 74a is brought into contact with the tapered face 74d of the valve seat 74b, whereby the biasing force is applied to the valve body 74a as a press-contact force in the direction of closing the valve body 74a.

In order to open the check valve 74 by the pressure of the working oil supplied from the third port 78, the press-contact force applied in the direction in which the valve body 74a is apart from the tapered face 74d of the valve seat 74b, i.e., in the direction of opening the valve, exceeds the press-contact force applied in the direction in which the valve body 74a is brought into contact with the tapered face 74d of the valve seat 74b, i.e., in the direction of closing the valve, whereby the valve body 74a is apart from the tapered face 74d of the valve seat 74b. The press-contact force, which is applied to the valve body 74a, in the direction of opening the valve is a pressure of a space T4 formed by the guide member 75, the spool 76, and the check valve 74 in the second-port-side channel 73b. The press-contact force, which is applied to the valve body 74a, in the direction of closing the valve includes the biasing force generated by the elastic member 71b and the pressure at the first-port-side channel 73a, i.e., the pressure at the primary hydraulic chamber 55. The pressure of the primary hydraulic chamber 55 is exerted on the first port 71 and the first-port-side channel 73a, but the valve body 74a is not apart from the valve seat 74b even if the pressure of the primary hydraulic chamber 55 increases, since the pressure of the primary hydraulic pressure 55 is applied in the direction in which the valve body 74a is brought into contact with the tapered face 74d of the valve seat 74b, i.e., in the direction of closing the valve. Therefore, so long as the press-contact force applied to the valve body 74a in the direction of opening the valve does not exceed the press-contact force in the direction of opening the valve, the closed state of the check valve 74 is maintained, so that the working oil in the primary hydraulic chamber 55, which is the positioning hydraulic chamber, is surely retained in the primary hydraulic chamber 55.

When the working oil is kept supplied to the primary hydraulic chamber 55 from the working-oil supply control device 120 in order to keep the position of the primary movable sheave 53 to the primary stationary sheave 52 in the axial direction constant, like a conventional belt-type continuously variable transmission, the working oil at a predetermined pressure is present in the working oil supply path from the working-oil supply control device 120 to the primary hydraulic chamber 55. The working oil supply path includes plural sliding portions of a stationary member and a movable member, so that the working oil at a predetermined pressure might be leaked to the outside of the working oil supply path from the sliding portions, when the gear ratio is fixed. The stationary member means the member that does not rotate or slide among the components constituting the belt-type continuously variable transmission 1. Examples of the member include the transaxle housing 21, the transaxle case 22, and the transaxle rear cover 23 of the transaxle 20. On the other hand, the movable member means the member that rotates or slides among the components constituting the belt-type continuously variable transmission 1. Examples of the member include the primary pulley shaft 51. Therefore, the sliding portion includes the portion where the primary pulley shaft 51 rotates with respect to the transaxle housing 21, the transaxle case 22, the transaxle rear cover 23, or the like of the transaxle 20.

In the aforesaid belt-type continuously variable transmission 1, each of the flow control valves 70 is arranged between the primary hydraulic chamber 55 and the sliding portion. Specifically, the sliding portion of the stationary member and the movable member is not present between the primary hydraulic chamber 55 and each of the flow control valves 70 when the check valve 74 of each flow control valve 70 is maintained to be closed so as to retain the working oil in the primary hydraulic chamber 55. Thus, the leakage of the working oil from the sliding portion can be prevented, whereby the increase in the power loss of the oil pump 122 can be prevented.

The guide member 75 constitutes a part of the valve-opening control section, and is arranged in the second-port-side channel 73*b* of the working fluid channel 73. The guide member 75 is cylindrical, and arranged with the other end in contact with the valve seat 74*b* of the check valve 74. A guide-side tapered face 75*a* whose diameter increases from one end toward the other face (from the second port side toward the first port side) is formed at the inner peripheral surface of the guide member 75. A communication portion 75*b* is formed for communicating the outer peripheral surface with the inner peripheral surface at the other end. The communication portion 75*b* communicates the third port 78 and the second-port-side channel 73*b*, here the space T4. The guide member 75 has a communication portion 75*c* that communicates the outer peripheral surface and the inner peripheral surface in the vicinity of one end. This communication portion 75*c* communicates the second port 72 and the second-port-side channel 73*b*, here, the space T5 formed between the guide member 75 and the spool.

The spool 76 constitutes a part of the valve-opening control section. When the spool 76 moves toward the first port in the axial direction, it is brought into contact with the valve body 74*a* of the check valve 74, and allows the valve body 74*a* to move in the direction apart from the valve seat 74*b*, whereby the check valve 74 is forcibly opened. The spool 76 is arranged in the second-port-side channel 73*b* of the working fluid channel 73, i.e., in the guide member 75 here, and is slidably inserted into the guide member 75. Specifically, the spool 76 is arranged coaxial with the working fluid channel 73, so that it can move in the axial direction of the spool 76. The spool 76 is composed of a main body 76*a* and a projection 76*b*. The main body 76*a* is cylindrical, wherein a narrow portion 76*c* that is continuous in the circumferential direction is formed at the center in the longitudinal direction. A spool-side tapered face 76*d* whose diameter increases from one end to the other end of the main body 76*a* (from the second port side toward the first port side) is formed at the narrow portion 76*c* at the first port side. The projection 76*b* is formed so as to project toward the first port side at the position of the other end face of the main body 76*a* opposite to the valve body 74*a* of the check valve 74. When the spool 76 moves toward the first port in the axial direction, it is brought into contact with the valve body 74*a* of the check valve 74, and allows the valve body 74*a* in the direction apart from the valve seat 74*b*, whereby the check valve 74 is forcibly opened.

The diameter of the spool 76 of at least the portion at the first port side from the narrow portion 76*c* of the main body 76*a* is set with respect to the inner diameter of the portion of the guide member 75 at the second port side from the guide-side tapered face 75*a* in such a manner that the spool 76 can slide in the axial direction relative to the guide member 75, and the communication between the space T4 and the space T5 is blocked or substantially blocked.

A cylinder 77 constitutes a part of the valve-opening control section, and is arranged in the second-port-side channel 73*b* of the working fluid channel 73. The cylinder 77 has a disc-like shape, and is arranged with the other end face in contact with one end face of the spool 76 for moving the spool 76 in the axial direction. A step 77*a* is formed at the outer peripheral surface at the center of the cylinder 77 in the axial direction. The elastic member 77*b* is arranged between the cylinder 77 and the guide member 75. The elastic member 77*b* is arranged and biased between the cylinder 77 and the guide member 75. The elastic member 77*b* generates a biasing force for moving the spool 76 toward the second port in the axial direction through the cylinder 77, wherein the biasing force is applied to the spool 76 via the cylinder 77 as a press-contact force in the direction of moving the spool 76 toward the second port in the axial direction.

The third port 78 is formed to the primary partitioning wall 54 at the inside in the diameter direction of the working fluid channel 73 so as to be parallel to the direction orthogonal to the longitudinal direction of the working fluid channel 73, i.e., parallel to the axial direction of the primary pulley 50. One end of the third port 78 is open to the communication path 54*a*, while the other end thereof is closed by the closing member. A part of the side face of the third port 78 is open to the space T4 through the second-port-side channel 73*b* of the working fluid channel 73, i.e., the communication portion 75*b* of the guide member 75 here. Specifically, the third port 78 is arranged between the check valve 74 and the spool 76 serving as the valve-opening control section for communicating the second-port-side channel 73*b* of the flow control valve 70, i.e., the space T4 here, and the working-oil supply control device 120.

The drive pressure chamber 79 constitutes a part of the valve-opening control section, and is formed among the cylinder 77, the closing member 73*e*, and the second-port-side channel 73*b*. The drive pressure chamber 79 forcibly opens the check valve 74 by the pressure of the working oil, which is the working fluid, supplied from the communication path 54*b*, i.e., the pressure of the drive pressure chamber 79, through the cylinder 77 and the spool 76.

In order to forcibly open the check valve 74 by the pressure of the drive pressure chamber 79, the press-contact force for pressing the valve body 74*a* by the spool 76 in the direction of opening the valve exceeds the force that is the total of the press-contact force applied to the valve body 74*a* in the direction of closing the valve and the press-contact force for moving the spool 76 toward the second port in the axial direction, whereby the valve body 74*a* is apart from the tapered face 74*d* of the valve seat 74*b*. The press-contact force of the spool 76 for pressing the valve body 74*a* in the direction of opening the valve is the pressure of the drive pressure chamber 79. The press-contact force applied to the valve body 74*a* in the direction of closing the valve is the biasing force generated by the elastic member 71*b* and the pressure of the first-port-side channel 73*a*, i.e., the pressure of the primary hydraulic chamber 55. The press-contact force for moving the spool 76 toward the second port in the axial direction is the biasing force generated by the elastic member 77*b*.

Although the flow control valve 70 uses the pressure of the drive pressure chamber 79 as the valve-opening control section, the invention is not limited thereto. A rotation force of a motor or electromagnetic force may be employed.

The power transmission path 90 is arranged between the secondary pulley 60 and the final decelerator 80. The power transmission path 90 is composed of an input shaft 91 coaxial with the secondary pulley shaft 61, an intermediate shaft 92 parallel to the secondary pulley shaft 61, a counter drive pinion 93, a counter driven gear 94, and a final drive pinion 95. The input shaft 91 and the counter drive pinion 93 fixed to the input shaft 91 are rotatably supported by bearings 108 and 109. The intermediate shaft 92 is rotatably supported by bearings 106 and 107. The counter driven gear 94 is fixed to the intermediate shaft 92 and meshed with the counter drive pinion 93. The final drive pinion 95 is fixed to the intermediate shaft 92.

The final decelerator 80 in the belt-type continuously variable transmission 1 transmits the output torque from the internal combustion engine 10 transmitted through the power transmission path 90 to the road surface from the wheels 110 and 110. The final decelerator 80 is composed of a differential case 81 having a hollow section, a pinion shaft 82, differential pinions 83 and 84, and side gears 85 and 86.

The differential case 81 is rotatably supported by bearings 87 and 88. A ring gear 89 is provided at the outer periphery of the differential case 81. This ring gear 89 is meshed with the final drive pinion 95. The pinion shaft 82 is mounted to the hollow section of the differential case 81. The differential pinions 83 and 84 are rotatably mounted to the pinion shaft 82. The side gears 85 and 86 are meshed with the differential pinions 83 and 84. The side gears 85 and 86 are fixed to the drive shafts 111 and 112 respectively.

The belt 100 in the belt-type continuously variable transmission 1 transmits the output torque from the internal combustion engine 10 transmitted through the primary pulley 50 to the secondary pulley 60. As shown in FIG. 1, the belt 100 is looped around the primary groove 100a of the primary pulley 50 and the secondary groove 100b of the secondary pulley 60. The belt 100 is an endless belt composed of a large number of metallic dies and plural steel rings.

The drive shafts 111 and 112 have side gears 85 and 86 fixed to one end thereof and wheels 110 and 110 mounted to the other end thereof.

The working-oil supply control device 120 supplies the working oil at least to the lubrication portion of each component of the belt-type continuously variable transmission 1 or each hydraulic chamber (including the primary hydraulic chamber 55, the secondary hydraulic chamber 64, and the drive pressure chamber 79). The working-oil supply control device 120 is composed of an oil tank 121, an oil pump 122, a pressure regulator 123, a clamping force adjusting valve 124, and a press-contact force adjusting valve 125.

The oil pump 122 is operated in conjunction with the output from the internal combustion engine 10, e.g., the rotation of the unillustrated crankshaft, as described above. The oil pump 122 sucks, pressurizes, and discharges the working oil stored in the oil tank 121. The pressurized and discharged working oil is supplied to the clamping force adjusting valve 124 and the press-contact force adjusting valve 125 via the pressure regulator 123. The pressure regulator 123 returns some working oils at the downstream side of the pressure regulator 123 to the oil tank 121, when the hydraulic pressure at the downstream side of the pressure regulator 123 becomes equal to or more than a predetermined hydraulic pressure.

The clamping force adjusting valve 124 adjusts the hydraulic pressure of the primary hydraulic chamber 55 of the primary pulley 50 and the hydraulic pressure of the secondary hydraulic chamber 64 of the secondary pulley 60 by controlling its opening degree. Specifically, the clamping force adjusting valve 124 controls the belt clamping force generated at the primary hydraulic chamber 55 of the primary pulley 50 and the secondary hydraulic chamber 64 of the secondary pulley 60. The clamping force adjusting valve 124 is connected to the working oil path 51a of the primary pulley shaft 51, whereby the working oil whose pressure is adjusted by the clamping force adjusting valve 124 is supplied to the primary hydraulic chamber 55 via the working oil path 51a. The working-oil supply control device 120 has another unillustrated claming force adjusting valve other than the clamping force adjusting valve 124. The unillustrated clamping force adjusting valve is connected to the unillustrated working oil path of the secondary pulley shaft 61, whereby the working oil whose pressure is adjusted by the clamping force adjusting valve is supplied to the secondary hydraulic chamber 64 via the unillustrated working oil path.

The press-contact force adjusting valve 125 adjusts, i.e., changes, the hydraulic pressure of each drive pressure chamber 79 through the control of its opening degree. Specifically, the press-contact force adjusting valve 125 controls the press-contact force for pressing the spool 76 toward the first port in the axial direction through the cylinder 77 in each drive pressure chamber 79, in order to forcibly open the check valve 74 by the valve-opening control section. The press-contact force adjusting valve 125 is connected to the working oil path 56a of the working fluid supply shaft 56 of the primary pulley shaft 51, whereby the working oil whose pressure is adjusted by the press-contact force adjusting valve 125 is supplied to the drive pressure chamber 79 through the working oil path 56a and the working oil path 51b.

Next, the operation of the belt-type continuously variable transmission 1 according to the present invention will be explained. Firstly, forward travel and backward travel of a general vehicle will be explained. When a driver selects an advancing position by an unillustrated shift position device mounted to a vehicle, an ECU (Engine Control Unit) not shown turns on the forward clutch 42 and off the reverse brake 43 by the working oil supplied from the working-oil supply control device 120, so as to control the advance/retreat changing mechanism 40. Thus, the input shaft 38 and the primary pulley shaft 51 are directly coupled. Specifically, the sun gear 44 and the ring gear 46 of the planetary gear drive 41 are directly coupled, the primary pulley shaft 51 is rotated in the direction same as the rotating direction of the crankshaft 11 of the internal combustion engine 10, and the output torque from the internal combustion engine 10 is transmitted to the primary pulley 50. The output torque from the internal combustion engine 10 transmitted to the primary pulley 50 is transmitted to the secondary pulley 60 through the belt 100, so that the secondary pulley shaft 61 of the secondary pulley 60 is rotated.

The output torque from the internal combustion engine 10 transmitted to the secondary pulley 60 is transmitted from the intermediate member 67 to the intermediate shaft 92 through the input shaft 91 of the power transmission path 90, the counter drive pinion 93, and the counter driven gear 94, thereby rotating the intermediate shaft 92. The output torque transmitted to the intermediate shaft 92 is transmitted to the differential case 81 of the final decelerator 80 through the final drive pinion 95 and the ring gear 89, thereby rotating the differential case 81. The output torque from the internal combustion engine 10 transmitted to the differential case 81 is transmitted to the drive shafts 111 and 112 through the differential pinions 83 and 84 and the side gears 85 and 86, and is transmitted to the wheels 110 and 110 mounted to the end portions of the drive shafts, whereby the wheels 110 and 110 are rotated with respect to the unillustrated road surface. Thus, the vehicle advances.

On the other hand, when a driver selects a retreating position by the unillustrated shift position device mounted to a vehicle, the ECU (Engine Control Unit) not shown turns off the forward clutch 42 and on the reverse brake 43 by the working oil supplied from the working-oil supply control device 120, so as to control the advance/retreat changing mechanism 40. Thus, the changeover carrier 47 of the planetary gear drive 41 is fixed to the transaxle case 22, so that each pinion 45 is held by the changeover carrier 47 so as to only make a rotation. Therefore, the ring gear 46 rotates in the direction same as the rotating direction of the input shaft 38, whereby each pinion 45 meshed with the ring gear 46 rotates in the direction same as the rotating direction of the input shaft 38 and the sun gear 44 meshed with each pinion 45 rotates in the direction reverse to the rotating direction of the input shaft 38. Specifically, the primary pulley shaft 51 coupled to the sun gear 44 rotates in the direction reverse to the rotating direction of the input shaft 38. Thus, the secondary pulley shaft 61 of the secondary pulley 60, the input shaft 91, the intermediate shaft 92, the differential case 81, the drive shafts 111 and 112, etc. rotate in the direction reverse to the direction in a case where the driver selects the advancing position, resulting in that the vehicle moves backward.

The ECU not shown controls the gear ratio of the belt-type continuously variable transmission 1 so as to optimize the operation condition of the internal combustion engine 10 on the basis of various conditions such as a vehicle speed or accelerator opening of a driver and maps stored in a storage unit in the ECU (e.g., optimum fuel consumption curve on the basis of the engine revolution and throttle opening, or the like). The control of the gear ratio of the belt-type continuously variable transmission 1 includes the change in the gear ratio and the fixation of the gear ratio (the gear ratio γ is steady). The change or fixation of the gear ratio is performed by controlling at least the hydraulic pressure of the primary hydraulic chamber 55, which is the positioning hydraulic chamber of the primary pulley 50, and the hydraulic pressure of the drive pressure chamber 79.

The gear ratio is changed as described below. Specifically, the working oil is supplied to the primary hydraulic chamber 55 from the working-oil supply control device 120 or discharged from the primary hydraulic chamber 55 to the outside of the primary pulley 50, whereby the primary movable sheave 53 slides in the axial direction of the primary pulley shaft 51. Accordingly, the space between the primary stationary sheave 52 and the primary movable sheave 53, i.e., the width of the primary groove 100a is adjusted. Thus, the contact radius of the primary pulley 50 to the belt 100 is changed, so that the gear ratio, which is the ratio of the revolution of the primary pulley 50 and the revolution of the secondary pulley 60, is steplessly (continuously) controlled. The gear ratio is fixed mainly by the inhibition of the discharge of the working oil to the outside of the primary pulley 50 from the primary hydraulic chamber 55.

At the secondary pulley 60, the hydraulic pressure of the working oil supplied to the secondary hydraulic chamber 64 from the working-oil supply control device 120 is controlled by the clamping force adjusting valve 124, whereby the belt clamping force for clamping the belt 100 by the secondary stationary sheave 62 and the secondary movable sheave 63 is adjusted. Thus, the belt tension of the belt 100 looped around the primary pulley 50 and the secondary pulley 60 is controlled.

The change in the gear ratio includes an up-shift, which is a gear ratio decreasing change in which the gear ratio is decreased, and a down-shift, which is a gear ratio increasing change in which the gear ratio is increased. They will be explained below.

The gear ratio is decreased in such a manner that the working oil is supplied to the primary hydraulic chamber 55 from the working-oil supply control device 120 for sliding (moving) the primary movable sheave 53 to the primary stationary sheave. As shown in FIGS. 6 and 7, each check valve 74 of each flow control valve 70 is opened so as to allow the supply of the working oil from the working-oil supply control device 120 to the primary hydraulic chamber 55. Specifically, the working oil whose pressure is adjusted by the clamping force adjusting valve 124 of the working-oil supply control device 120 is supplied from the third port 78 to the second-port-side channel 73b, i.e., the space T4, through the working oil path 51a, the communication path 51c, the spaces T1 and T2, and the communication path 54a. Thus, the pressure in the space T4 increases. When the press-contact force in the direction of opening the valve applied to the valve body 74a exceeds the pressure at the first-port-side channel 73a, i.e., the press-contact force applied to the valve body 74a in the direction of opening the valve, which force is the total of the pressure of the primary hydraulic chamber 55 and the biasing force of the elastic member 74c, according to this pressure, the valve body 74a moves in the direction of opening the valve, i.e., toward the first port as shown by the arrow B in FIGS. 6 and 7, so that the check valve 74 is opened. When the working oil having the pressure for opening the check valve 74 is supplied from the third port 78 when supplying the working oil, which is the working fluid, from the third port 78 to the first port 71 (the primary hydraulic chamber 55 that is the positioning hydraulic pressure), the supply of the working oil to the primary hydraulic chamber 55 by the flow control valves 70 is allowed.

When the supply of the working oil to the primary hydraulic chamber 55, which is the positioning primary hydraulic chamber, by the flow control valves 70 is allowed, the working oil supplied from the working-oil supply control device 120 to the second-port-side channel 73b (space T4) is supplied to the primary hydraulic chamber 55 through the first-port-side channel 73a and the first port 71 as shown by the arrow A in FIGS. 6 and 7. The pressure in the primary hydraulic chamber 55 increases due to the supplied working oil, so that the press-contact force for pressing the primary movable sheave 53 toward the primary stationary sheave increases. Therefore, the primary movable sheave 53 slides toward the primary stationary sheave in the axial direction. Accordingly, as shown in FIG. 6, the contact radius of the primary pulley 50 to the belt 100 increases, and the contact radius of the secondary pulley 60 to the belt 100 decreases, whereby the gear ratio decreases.

In this case, the working-oil supply control device 120 closes the press-contact force adjusting valve 125, so that the supply of the working oil from the working-oil supply control device 120 to the drive pressure chamber 79 is stopped. In this case, the spool 76 is positioned such that the portion of the main body 76a at the side of the first port from the narrow portion 76c is opposite to the portion of the guide member 75 at the side of the second port from the step 75a with respect to the guide member 75 by the biasing force generated by the elastic member 77b to the spool 76 via the cylinder 77. Specifically, the second-port-side channel 73b (the communication between the space T4 and the space T5) is blocked or substantially blocked by the guide member 75 and the spool 76 constituting the valve-opening control section. Therefore, it can be prevented that the working oil supplied to the second-port-side channel 73b (space T4) through the third port 78 is discharged to the outside of the primary pulley 50 from the second port 72. Since the press-contact force in the direction of opening the valve can be applied to the valve body 74a by the working oil supplied to the second-port-side channel 73b (space T4) via the third port 78, the check valve 74 can be opened with a simple structure. Further, since the third port 78 is arranged between the check valve 74 and the spool 76, the length of the channel can be adapted for supplying the working oil to the space T4 where the valve body 74a of the check valve 74 is exposed, so that the supply flow rate can be increased, and the responsiveness at the time of the shift can be enhanced.

The gear ratio is increased by discharging the working oil from the primary hydraulic chamber 55 for sliding (moving) the primary movable sheave 53 toward the side reverse to the primary stationary sheave. As shown in FIGS. 8, and 9-1 to 9-3, each check valve 74 of each flow control valve 70 is firstly forcibly opened by each spool 76 constituting the valve-opening control section so as to allow the discharge of the working oil from the primary hydraulic chamber 55. Specifically, the working oil whose pressure is adjusted by the press-contact force adjusting valve 125 of the working-oil supply control device 120 is supplied to the drive pressure chamber 79 through the working oil channel 56*a*, the communication hole 56*b*, the working oil channel 51*b*, the communication channel 51*d*, the space T2, and the communication channel 54*b* as shown by the arrow C in FIG. 8. The spool 76 receiving the pressure in the drive pressure chamber 79 to which the working oil is supplied presses the valve body 74*a* in the direction of opening the valve through the cylinder 77. The spool 76 allows the valve body 74*a* to move in the direction of opening the valve, i.e., toward the first port so as to forcibly open the check valve 74 as shown by the arrow E in FIGS. 9-1 to 9-3, when the press-contact force for pressing the valve body 74*a* in the direction of opening the valve indicated by the arrow D in FIGS. 9-1 to 9-3 exceeds the pressure at the first-port-side channel 73*a*, i.e., the force that is the total of the press-contact force applied to the valve body 74*a* in the direction of closing the valve by the pressure in the primary hydraulic chamber 55 and the press-contact force applied to the spool 76 via the cylinder 77 in the direction of moving the spool 76 toward the second port in the axial direction by the biasing force of the elastic member 77*b*.

In this case, the sectional area of the second-port-side channel 73*b* in the axial direction increases according to the moving amount of the spool 76 toward the first port. Specifically, the channel resistance decreases according to the moving amount (hereinafter simply referred to as "spool moving amount") of the spool 76 toward the first port. As shown in FIGS. 9-1 to 9-3, when the spool moving amount becomes equal to or more than a predetermined amount, the positional relationship of the spool 76 to the guide member 75 changes from the relationship in which the portion of the main body 76*a* at the first port side from the narrow portion 76*c* opposes to the portion of the guide member 75 at the second port side from the guide-side tapered face 75*a* to the relationship in which the guide-side tapered face 75*a* and the spool-side tapered face 76*d* are opposite to each other. Therefore, the second-port-side channel 73*b*, which is blocked or substantially blocked by the guide member 75 and the spool 76 that constitute the valve-opening control section, is released. With this, a ring shaped channel is formed between the guide member 75 and the spool 76 with the check valve 74 forcibly opened by the spool 76. Accordingly, the space T4 and the space T5 communicate with each other, so that the discharge of the working oil by the flow control valves 70 to the outside from the primary hydraulic chamber 55, which is the positioning hydraulic chamber, is allowed.

When the discharge of the working oil by the flow control valves 70 to the outside from the primary hydraulic chamber 55, which is the positioning hydraulic chamber, is allowed, the working oil in the primary hydraulic chamber 55 flows between the check valve 74 and the spool 76, i.e., into the space T4, of the second-port-side channel 73*b* through the first port 71 and the first-port-side channel 73*a* as shown by the arrow F in FIGS. 9-1 to 9-3. The working oil flowing in the space T4 is temporarily stored in this space T4, and is discharged to the outside of the primary pulley 50 through the portion between the guide member 75 and the spool 76, i.e., the space T5, the communication portion 75*c*, and the second port 72. Specifically, the working oil stored in the space T4 can uniformly flow in the space T5 from the ring shaped channel formed between the guide member 75 and the spool 76. Thus, the controllability of the discharge rate of the working oil can be enhanced.

In this case, the working-oil supply control device 120 closes the clamping force adjusting valve 124, whereby the supply of the working oil from the working-oil supply control device 120 to the primary hydraulic chamber 55 is stopped. Specifically, there is no chance that the working oil in the primary hydraulic chamber 55 flowing in the space T4 flows in the working-oil supply control device 120 through the third port 78. Since the working oil is discharged from the primary hydraulic chamber 55, the pressure in the primary hydraulic chamber 55 decreases, so that the press-contact force for pressing the primary movable sheave 53 toward the primary stationary sheave decreases, with the result that the primary movable sheave 53 slides in the direction reverse to the primary stationary sheave in the axial direction. Thus, the contact radius of the belt 100 to the primary pulley 50 decreases, and the contact radius of the belt 100 to the secondary pulley 60 increases, whereby the gear ratio increases.

When the pressure in the drive pressure chamber 79 further increases so as to increase the spool moving amount from the state in which the guide-side tapered face 75*a* and the spool-side tapered face 76*d* are opposite to each other during discharging the working oil from the primary hydraulic chamber 55 to the outside, the opening amount of the check valve 74 increases as shown in FIGS. 9-1 to 9-3. When the spool moving amount further increases from the state in which the guide-side tapered face 75*a* and the spool-side tapered face 76*d* are opposite to each other, i.e., from the beginning of opening the check valve 74, a clearance d between the guide member 75 and the spool 76 in the axial direction increases according to the spool moving amount. When the clearance d increases according to the increase in the spool moving amount, the sectional area of the second-port-side channel 73*b* in the axial direction increases. Specifically, the sectional area of the second-port-side channel 73*b* in the axial direction is more decreased, and the channel resistance is more increased, at the beginning of opening the check valve 74, than those at the middle stage or later of opening the check valve 74.

Therefore, as shown in FIG. 10, when the spool moving amount becomes equal to or more than the predetermined amount, the sectional area of the second-port-side channel 73*b* in the axial direction increases according to the spool moving amount. Specifically, as the spool moving amount is small, i.e., at the beginning of opening the check valve 74, the valve-opening control section reduces the sectional area of the second-port-side channel 73*b* and increases the channel resistance of the second-port-side channel 73*b*. With this, as shown in FIG. 11, the discharge rate of the working oil discharged to the outside of the primary pulley 50 from the primary hydraulic chamber 55 increases according to the increase in the spool moving amount.

The gear ratio is fixed in such a manner that the position of the primary movable sheave 53 to the primary stationary sheave 52 in the axial direction is constant without discharging the working oil from the primary hydraulic chamber 55, and the movement of the primary movable sheave 53 to the primary stationary sheave 52 is regulated. The case in which the gear ratio is fixed, i.e., the gear ratio is made steady, is when the unillustrated ECU determines that the remarkable change in the gear ratio is unnecessary, such as when the running condition of the vehicle is stable. As shown in FIG. 4, the check valve 74 of each flow control valve 70 is maintained closed so as to inhibit the discharge of the working oil from the primary hydraulic chamber 55. Specifically, the working-oil supply control device 120 closes both the clamping force adjusting valve 124 and the press-contact force adjusting valve 125 for stopping the supply of the working oil to the second-port-side channel 73*b* (space T4) through the third port 78 and the supply of the working oil to the drive pressure chamber 79 from the working-oil supply control device 120.

Since the belt tension of the belt 100 changes even at the time of fixing the gear ratio, the contact radius of the belt 100 to the primary pulley 50 starts changing, whereby the position of the primary movable sheave 53 to the primary stationary sheave 52 in the axial direction may change. Since the working oil is retained in the primary hydraulic chamber 55 as described above, when the position of the primary movable sheave 53 to the primary stationary sheave 52 in the axial direction starts changing, the pressure in the primary hydraulic chamber 55 changes, but the position of the primary movable sheave 53 to the primary stationary sheave 52 in the axial direction is kept fixed. Accordingly, it is unnecessary to raise the pressure in the primary hydraulic chamber 55 by supplying the working oil from the outside to the primary hydraulic chamber 55 for keeping the position of the primary movable sheave 53 to the primary stationary sheave 52 in the axial direction constant. Thus, the oil pump 122 provided to the unillustrated working-oil supply control device for supplying the working oil to the primary hydraulic chamber 55 does not have to be driven at the time of fixing the gear ratio, whereby the increase in the power loss of the oil pump 122 can be suppressed.

As described above, the spool 76 forcibly opens the check valve 74 by the movement thereof toward the first port in the axial direction, and as the moving amount is small, i.e., at the beginning of opening the check valve 74 by the spool 76, the sectional area of the channel between the spool 76 and the second-port-side channel in the axial direction reduces. Specifically, the valve-opening control section increases the channel resistance of the second-port-side channel 73b, as the opening amount of the check valve 74 is small, i.e., at the beginning of opening the check valve 74, when it forcibly opens the check valve 74, whereby the working oil, which is the working fluid, is difficult to flow from the first port 71 to the second port 72. Therefore, the discharge rate of the working fluid discharged from the first port 71 to the second port 72 immediately after the check valve 74 is opened, i.e., at the beginning of opening the check valve 74, can be reduced. With this, the over-discharge of the working oil at the beginning of opening the check valve 74 can be prevented when the working oil is discharged from the primary hydraulic chamber 55 that is the positioning hydraulic chamber. Accordingly, the controllability of the down-shift, i.e., when increasing the gear ratio, can be enhanced.

When the working oil having the pressure for opening the check valve 74 is supplied from the third port 78 to the space T4 between the check valve 74 and the spool 76 constituting the valve-opening control section, the check valve 74 is opened so as to supply the working oil from the third port 78 to the first port 71. Therefore, the single check valve 74 can supply the working oil to the primary hydraulic chamber 55 that is the portion communicating with the first port 71, can discharge the working oil from the primary hydraulic chamber 55, and can retain the working oil at the primary hydraulic chamber 55. Consequently, the controllability of changing or fixing the gear ratio can be simplified, the number of components can be reduced, and cost can be reduced.

Since the spool 76 is arranged coaxial with the working fluid channel 73, a streamline through which the working oil, which is the working fluid, discharged from the first port 71 to the second port 72 via the spool 76, passes can be made linear as indicated by an arrow F in FIGS. 9-1 to 9-3. Therefore, the channel resistance when the working oil is discharged from the first port 71 to the second port 72 via the spool 76 can be reduced. Further, the responsiveness for the discharge rate control of the working oil discharged from the first port 71 to the second port 72 via the spool 76 can be enhanced.

In the present embodiment, the guide-side tapered face 75a is formed on the inner peripheral surface of the guide member 75. However, it may not be formed if the sectional area of the second-port-side channel 73b increases according to the increase in the moving amount of the spool 76 toward the first port in the axial direction.

In the present embodiment, the center of the working fluid channel 73 in the longitudinal direction is arranged with respect to the primary pulley 50 of each flow control valve 70 such that the rotating radius of the primary pulley 50 from the center of the rotation becomes the smallest. However, the invention is not limited thereto. FIG. 12 is a sectional view showing an essential part of another primary pulley. As shown in FIG. 12, each flow control valve 70 may be arranged to the primary pulley 50 in such a manner that the rotating radius N1 of the drive pressure chamber 79 from the center of the rotation O of the primary pulley 50 becomes larger than the rotating radius N2 of the other portion, e.g., the space T4, where the working oil that is the working fluid is present or the rotating radius N1 of the first-port-side channel 73a.

Since each flow control valve 70 is arranged to the primary pulley 50 as described above, the rotating radius N3 of the drive pressure chamber 79 is larger than the rotating radius N2 of the space T4 or the rotating radius N1 of the first-port-side channel 73a. Therefore, the centrifugal hydraulic pressure exerted to the drive pressure chamber 79 becomes larger than the centrifugal hydraulic pressure exerted to these portions. Accordingly, the pressure in the drive pressure chamber 79 can be reduced when the spool 76 constituting the valve-opening control section forcibly opens the check valve 74. Consequently, the increase in the power loss of the oil pump 122, which is a fluid pump for supplying the working oil that is the working fluid to the drive pressure chamber 79, can further be suppressed, whereby the transmission efficiency of the belt-type continuously variable transmission 1 can be enhanced.

Since the centrifugal hydraulic pressure exerted to the drive pressure chamber 79 can be increased, the pressure-receiving area of the cylinder 77 can be reduced. Therefore, the flow control valve 70 can be miniaturized, whereby drivability can be enhanced by the reduction in inertia.

In the present embodiment, the valve seat 74 of the check valve 74 is arranged coaxial with the first-port-side channel 73a, but the invention is not limited thereto. FIG. 13-1 is a view showing another configuration of a flow control valve. FIG. 13-2 is a view for explaining the operation of the flow control valve shown in FIG. 13-1. FIG. 13-3 is a view for explaining the operation of the flow control valve shown in FIG. 13-1.

When the primary pulley 50 rotates, a centrifugal force toward the outside in the diameter direction of the primary pulley 50 is applied to the valve body 74a as shown by the arrow G in FIG. 13-1. Therefore, when the valve seat 74b of the check valve 74 and the first-port-side channel 73a are coaxially arranged as shown in FIG. 4, the clearance between the valve body 74a at the outside in the diameter direction and the first-port-side channel 73a is large, thereby entailing a problem that the positional relationship between the valve body 74a and the valve seat 74b in the axial direction cannot be maintained due to this centrifugal force, when the valve body 74a is apart from the valve seat 74b.

In view of this, as shown in FIG. 13-1, the first-port-side channel 73a is formed with respect to the second-port-side channel 73b in such a manner that the axis O2 of the first-port-side channel 73a is offset from the axis O1 of the valve seat 74b of the check valve 74 toward the inside in the diameter direction of the primary pulley 50. With this structure, the movement of the valve body 74a toward the outside in the diameter direction is regulated by the portion at the outside in the diameter direction of the first-port-side channel 73a, when the valve body 74a is apart from the valve seat 74b. Specifically, as shown in FIGS. 13-2 and 13-3, the first-port-side channel 73a functions as a regulating section for regulating the movement toward the outside in the diameter direction, when the valve body 74a is apart from the valve seat 74b.

Accordingly, the positional relationship between the valve body 74a and the valve seat 74b in the axial direction can be maintained, when the primary pulley 50 rotates. Thus, the behavior of the valve body 74a from the opened state to the closed state of the check valve 74 can be stabilized, whereby the responsiveness of the check valve 74 to its closed state can be enhanced.

The sectional area of the channel between the valve body 74a and the first-port-side channel 73a in the axial direction when the valve body 74a is apart from the valve seat 74b can be secured, since the axis O2 of the first-port-side channel 73a only offsets from the axis O1 of the valve seat 74b of the check valve 74 toward the inside in the diameter direction of the primary pulley 50. Therefore, the working oil can be discharged from the primary hydraulic chamber 55 to the outside of the primary pulley 50 as indicated by the arrow F1 in FIG. 13-3.

FIG. 14-1 is a view showing another configuration of the flow control valve. FIG. 14-2 is a view for explaining the operation of the flow control valve shown in FIG. 14-1. The portion of the spool 76 opposite to the check valve 74, i.e., the other end face thereof, in this embodiment may be the spool-side tapered face 76d whose diameter increases from the other end face to one end face (from the first port side to the second port side). By virtue of this configuration, the portion of the spool 76 corresponding to the valve body 74a is the spool-side tapered face 76d, whereby the check valve 74 is opened, and the working oil flowing in the space T4 through the first port 71 and the first-port-side channel 73a from the primary hydraulic chamber 55 is difficult to collide with the spool 76. Accordingly, when the working oil is discharged from the primary hydraulic chamber 55 to the outside of the primary pulley 50 as shown by the arrow F2 in FIG. 14-2, the influence to the streamline through which the working oil passes can be reduced. Consequently, the responsiveness in the discharge rate control of the working oil discharged from the first port 71 to the second port 72 by the spool 76 can further be enhanced. Since the dynamic pressure applied to the spool 76 is reduced, the positional control of the spool 76 in the axial direction can be facilitated.

INDUSTRIAL APPLICABILITY

As described above, the flow control valve, the rotor and the belt-type continuously variable transmission according to the present invention are useful for the transmission of a driving force of a vehicle, and particularly suitable for preventing the over-discharge of a working fluid at the beginning of a valve opening.

The invention claimed is:
1. A flow control valve comprising:
a first port;
a second port;
a working fluid channel that is formed between the first port and the second port, and through which a working fluid passes;
a check valve that is arranged in the working fluid channel, and is opened toward a first-port-side channel from a second-port-side channel of the working fluid channel;
a valve-opening control section that is arranged at the check valve at the side of the second port, that forcibly opens the check valve when discharging the working fluid from the first port to the second port, and that increases a channel resistance of the second-port-side channel at the beginning of opening the check valve,
wherein the valve-opening control section includes
a spool that is arranged so as to be slidable in the axial direction in the working fluid channel and has a main body which is cylindrical and provided with a narrow portion that is continuous in the circumferential direction formed at the center in the longitudinal direction, and a projection formed so as to project toward the first port side at a position opposite to the check valve, and
a guide member that is arranged in the second-port-side channel of the working fluid channel and forms a first space between the spool and the check valve and a second space between the spool and the guide member, and
wherein the spool forcibly opens the check valve by moving toward the first port in the axial direction, and reduces a channel sectional area in the second space between the spool and the second-port-side channel at the beginning of opening the check valve.
2. A flow control valve according to claim 1, further comprising a third port between the check valve and the valve-opening control section in the working fluid channel, wherein the working fluid having a pressure for opening the check valve is supplied from the third port when supplying the working fluid to the first port from the third port.
3. A flow control valve according to claim 1, wherein the spool is arranged coaxial with the working fluid channel.
4. A flow control valve according to claim 1, wherein the spool has a tapered shape at a portion opposite to the check valve.
5. A flow control valve comprising:
a first port;
a second port;
a working fluid channel that is formed between the first port and the second port, and through which a working fluid passes;
a check valve that is arranged in the working fluid channel, and is opened toward a first-port-side channel from a second-port-side channel of the working fluid channel;
a valve-opening control section that is arranged at the check valve at the side of the second port, that forcibly opens the check valve when discharging the working fluid from the first port to the second port, and that increases a channel resistance of the second-port-side channel as an opening amount of the check valve is small,
wherein the valve-opening control section includes
a spool that is arranged so as to be slidable in the axial direction in the working fluid channel and has a main body which is cylindrical and provided with a narrow portion that is continuous in the circumferential direction formed at the center in the longitudinal direction, and a projection formed so as to project toward the first port side at a position opposite to the check valve, and
a guide member that is arranged in the second-port-side channel of the working fluid channel and forms a first space between the spool and the check valve and a second space between the spool and the guide member, and wherein the spool forcibly opens the check valve by moving toward the first port in the axial direction, and reduces a channel sectional area in the second space between the spool and the second-port-side channel as an amount of the moving is small.

6. A flow control valve according to claim 5, further comprising a third port between the check valve and the valve-opening control section in the working fluid channel, wherein
the working fluid having a pressure for opening the check valve is supplied from the third port when supplying the working fluid to the first port from the third port.

7. A flow control valve according to claim 5, wherein
the spool is arranged coaxial with the working fluid channel.

8. A flow control valve according to claim 5, wherein
the spool has a tapered shape at a portion opposite to the check valve.

9. A rotor comprising the flow control valve according to claim 1, wherein
the check valve includes a valve seat, a valve body that is opened when the valve body is apart from the valve seat, and a regulating section that regulates a movement of the rotor toward the outside in the diameter direction when the valve body is apart from the valve seat.

10. A rotor comprising the flow control valve according to claim 1, wherein
the longitudinal direction of the flow control valve is skew with respect to the axial direction of the rotor.

11. A rotor according to claim 10, wherein
the valve-opening control section has a drive pressure chamber that forcibly opens the check valve by a pressure of the supplied working fluid, and
a rotating radius of the drive pressure chamber is larger than a rotating radius of another portion where the working fluid is present.

12. A rotor according to claim 11, wherein
the check valve includes a valve seat, a valve body that is opened when the valve body is apart from the valve seat, and a regulating section that regulates a movement of the rotor toward the outside in the diameter direction when the valve body is apart from the valve seat.

13. A rotor according to claim 10, wherein
the check valve includes a valve seat, a valve body that is opened when the valve body is apart from the valve seat, and a regulating section that regulates a movement of the rotor toward the outside in the diameter direction when the valve body is apart from the valve seat.

14. A belt-type continuously variable transmission comprising:
two pulleys having two pulley shafts that are arranged parallel to each other, to either one of which a driving force from a driving source is transmitted, two movable sheaves that slide on the two pulley shafts in the axial direction, respectively, two stationary sheaves that are opposite to the two movable sheaves in the axial direction, respectively;
a belt that transmits the driving force transmitted to either one of two pulleys from the driving source, to the other pulley; and
a positioning hydraulic chamber that presses the movable sheaves to the stationary sheaves, wherein
the rotor according to claim 9 is either one of the two pulley shafts.

15. A belt-type continuously variable transmission according to claim 14, wherein
the first port communicates with the positioning hydraulic chamber.

16. A rotor comprising the flow control valve according to claim 5, wherein
the check valve includes a valve seat, a valve body that is opened when the valve body is apart from the valve seat, and a regulating section that regulates a movement of the rotor toward the outside in the diameter direction when the valve body is apart from the valve seat.

17. A rotor comprising the flow control valve according to claim 5, wherein
the longitudinal direction of the flow control valve is skew with respect to the axial direction of the rotor.

18. A belt-type continuously variable transmission comprising:
two pulleys having two pulley shafts that are arranged parallel to each other, to either one of which a driving force from a driving source is transmitted, two movable sheaves that slide on the two pulley shafts in the axial direction, respectively, two stationary sheaves that are opposite to the two movable sheaves in the axial direction, respectively;
a belt that transmits the driving force transmitted to either one of two pulleys from the driving source, to the other pulley; and
a positioning hydraulic chamber that presses the movable sheaves to the stationary sheaves, wherein
the rotor according to claim 17 is either one of the two pulley shafts.

* * * * *